United States Patent
Nakamura et al.

(10) Patent No.: US 12,481,747 B2
(45) Date of Patent: Nov. 25, 2025

(54) INFORMATION PROCESSING APPARATUS AND INFORMATION PROCESSING SYSTEM IDENTIFYING FIRST USER OF FIRST ELECTRONIC DEVICE AND SECOND USER OF SECOND ELECTRONIC DEVICE TO TRANSMIT INFORMATION

(71) Applicants: Aoi Nakamura, Tokyo (JP); Nekka Matsuura, Kanagawa (JP)

(72) Inventors: Aoi Nakamura, Tokyo (JP); Nekka Matsuura, Kanagawa (JP)

(73) Assignee: Ricoh Company, Ltd., Tokyo (JP)

(\*) Notice: Subject to any disclaimer, the term of this patent is extended or adjusted under 35 U.S.C. 154(b) by 201 days.

(21) Appl. No.: 18/185,706

(22) Filed: Mar. 17, 2023

(65) Prior Publication Data
US 2023/0306096 A1    Sep. 28, 2023

(30) Foreign Application Priority Data
Mar. 22, 2022 (JP) ................................. 2022-045720
Nov. 30, 2022 (JP) ................................. 2022-192278

(51) Int. Cl.
*G06F 21/41* (2013.01)
*G06F 21/32* (2013.01)
*H04L 9/40* (2022.01)

(52) U.S. Cl.
CPC .............. *G06F 21/41* (2013.01); *G06F 21/32* (2013.01); *H04L 63/0853* (2013.01); *H04L 63/0861* (2013.01); *H04L 63/0884* (2013.01)

(58) Field of Classification Search
CPC ....... G06F 21/41; G06F 21/32; H04L 63/0861
See application file for complete search history.

(56) References Cited

U.S. PATENT DOCUMENTS 12,189,736 B1 *   1/2025   Salter ..................... G06T 7/70
2004/0010724 A1 * 1/2004   Brown ............... H04L 63/0861
                                                    713/186
(Continued)

FOREIGN PATENT DOCUMENTS

JP       5238409      7/2013
JP    2014-153805     8/2014
(Continued)

OTHER PUBLICATIONS

Japanese Office Action for JP2023-005177—Sep. 30, 2025 (Year: 2025).*

*Primary Examiner* — Boris D Grijalva Lobos
(74) *Attorney, Agent, or Firm* — IPUSA, PLLC

(57) ABSTRACT

An information processing apparatus includes a first image receiver configured to receive, from an imaging apparatus, a first image capturing a first user using a first electronic device; a first user identifier configured to identify the first user who used the first electronic device based on usage information and the first image; an input information receiver configured to receive, from the first electronic device, authentication information input to the first electronic device by the first user; a second image receiver configured to receive, from the imaging apparatus, a second image capturing a second user existing at an operable position of a second electronic device; a second user identifier configured to identify the second user based on the second image; and an operation instructor configured to transmit, to the second electronic device, the authentication information, based on information relating to the identified first and second users and the authentication information.

19 Claims, 22 Drawing Sheets

(56) References Cited

U.S. PATENT DOCUMENTS

| | | | |
|---|---|---|---|
| 2014/0223532 A1 | 8/2014 | Satoh et al. | |
| 2017/0171431 A1 | 6/2017 | Towata | |
| 2017/0235530 A1 | 8/2017 | Nakamura | |
| 2018/0077303 A1 | 3/2018 | Nakamura | |
| 2019/0286389 A1 | 9/2019 | Nakamura | |
| 2020/0097229 A1 | 3/2020 | Nakamura | |
| 2020/0274865 A1* | 8/2020 | Araújo | H04W 12/04 |
| 2021/0200854 A1* | 7/2021 | Gorsica, IV | G06F 21/78 |
| 2021/0272086 A1* | 9/2021 | Buibas | G06K 7/1417 |
| 2022/0038448 A1* | 2/2022 | DeFilippo | H04L 67/12 |
| 2022/0147611 A1* | 5/2022 | Nishimura | G06F 21/44 |
| 2022/0207915 A1* | 6/2022 | Voss | G07C 9/257 |

FOREIGN PATENT DOCUMENTS

| | | |
|---|---|---|
| JP | 2017-107473 | 6/2017 |
| JP | 2020-123354 | 8/2020 |

* cited by examiner

FIG.7A

| REGISTERED OBJECT ID | GROUP ID | EXISTENCE CONFIRMATION FLAG | ATTRIBUTE INFORMATION | DEVICE OPERATION INFORMATION |
|---|---|---|---|---|
| U001 | G001 | 1 | (x1.y1.z1) | ... |
| U002 | G001 | 1 | (x2.y2.z2) | ... |
| U003 | 0 | 1 | (x3.y3.z3) | ... |
| ... | ... | ... | ... | ... |

FIG.7B

| REGISTERED DEVICE ID | ATTRIBUTE INFORMATION | DEVICE INPUT INFORMATION | DEVICE OUTPUT INFORMATION |
|---|---|---|---|
| D001 | (x4.y4.z4) | ... | ... |
| D002 | (x5.y5.z5) | ... | ... |
| ... | ... | ... | ... |

FIG.7C

| DETECTED OBJECT ID | GROUP ID | ATTRIBUTE INFORMATION |
|---|---|---|
| T001 | 0 | (x6.y6.z6) |
| T002 | G002 | (x7.y7.z7) |
| ... | ... | ... |

FIG.20

| | OUTPUT CONDITION | OPERATION INSTRUCTION |
|---|---|---|
| 1 | AUTHENTICATION INFORMATION INPUT AT OTHER ELECTRONIC DEVICE (MFP) BY mTH REGISTERED OBJECT (PERSON $\alpha$) IS AUTHENTICATION INFORMATION THAT CAN BE AUTHENTICATED BY nTH ELECTRONIC DEVICE (ELECTRONIC BLACKBOARD) | 1. AUTOMATICALLY AUTHENTICATE PERSON $\alpha$ AT ELECTRONIC BLACKBOARD<br>2. DISPLAY "MR. $\alpha$, AUTOMATIC AUTHENTICATION HAS BEEN PERFORMED" FOR SEVERAL SECONDS ON ELECTRONIC BLACKBOARD<br>3. WHEN PERSON $\alpha$ HAS BEEN INPUTTING INFORMATION AT MFP, DISPLAY MESSAGE OF "DISPLAY INFORMATION THAT YOU INPUT AT DEVICE ○○ JUST THEN?" AND SELECTION BUTTON OF YES/NO<br>4. IDENTIFY USAGE LANGUAGE SET AT MFP FROM DEVICE OPERATION HISTORY OF PERSON $\alpha$, AND APPLY TO DISPLAY ON ELECTRONIC BLACKBOARD<br>5. WHEN ATTRIBUTE INFORMATION OF ELECTRONIC DEVICE IS "DURING ENERGY SAVING MODE", DO NOT TRANSMIT OPERATION INSTRUCTION |
| 2 | AUTHENTICATION INFORMATION INPUT AT OTHER ELECTRONIC DEVICE (MFP) BY kTH REGISTERED OBJECT (PERSON $\beta$) IS AUTHENTICATION INFORMATION THAT CAN BE AUTHENTICATED BY nTH ELECTRONIC DEVICE (ELECTRONIC BLACKBOARD)<br>* kTH REGISTERED OBJECT (PERSON $\beta$) HAS SAME GROUP ID AS mTH REGISTERED OBJECT (PERSON $\alpha$) | 1. AUTOMATICALLY AUTHENTICATE PERSON $\alpha$ AT ELECTRONIC BLACKBOARD<br>2. DISPLAY "AUTOMATIC AUTHENTICATION HAS BEEN PERFORMED BY AUTHENTICATION INFORMATION OF MR. $\beta$" FOR SEVERAL SECONDS ON SCREEN OF ELECTRONIC BLACKBOARD<br>3. WHEN PERSON $\beta$ HAS BEEN INPUTTING INFORMATION AT MFP, DISPLAY MESSAGE OF "DISPLAY INFORMATION THAT MR. $\beta$ INPUT AT DEVICE ○○?" AND SELECTION BUTTON OF YES/NO |

FIG.21

| | OUTPUT CONDITION | OPERATION INSTRUCTION |
|---|---|---|
| 1-1 | DEVICE OPERATION INFORMATION EXISTS, IN WHICH mTH REGISTERED OBJECT (PERSON $\alpha$) HAS PERFORMED OPERATION THAT INCURS FEE AT ELECTRONIC DEVICE 30-1 (MFP), AND PAYMENT COMPLETED FLAG INDICATES PAYMENT NOT COMPLETED 0 (=false) | 1. ADD MFP USAGE FEE TO BILLING AMOUNT TO BE PRESENTED TO PERSON $\alpha$ AND PRESENT AMOUNT AFTER ADDITION<br>2. INSTRUCT MANAGEMENT APPARATUS TO UPDATE PAYMENT COMPLETED FLAG OF DEVICE OPERATION INFORMATION OF PERSON $\alpha$ TO INDICATE PAYMENT COMPLETED 1 (=true) |
| 1-2 | DEVICE OPERATION INFORMATION EXISTS, IN WHICH kTH REGISTERED OBJECT (PERSON $\beta$) HAS PERFORMED OPERATION THAT INCURS FEE AT ELECTRONIC DEVICE 30-1 (MFP), AND PAYMENT COMPLETED FLAG INDICATES PAYMENT NOT COMPLETED 0 (=false)<br>* PERSON $\beta$ HAS SAME GROUP ID AS PERSON $\alpha$ | 1. ADD MFP USAGE FEE RELATING TO PERSON $\beta$ TO BILLING AMOUNT TO BE PRESENTED TO PERSON $\alpha$ AND PRESENT AMOUNT AFTER ADDITION<br>2. WITH RESPECT TO MFP USAGE FEE RELATING TO PERSON $\beta$, DISPLAY OPTION OF "PERSON $\beta$ WILL PAY, NOT PERSON $\alpha$" AND SELECTION BUTTON OF "YES" AND/OR "NO". WHEN "YES" IS SELECTED, MFP USAGE FEE OF PERSON $\beta$ IS ADDED TO BILLING AMOUNT TO BE PRESENTED TO PERSON $\alpha$ TO SET BILLING FEE. WHEN "NO" IS SELECTED, BILLING AMOUNT TO BE PRESENTED TO PERSON $\alpha$ WILL BE SET AS BILLING FEE, WITHOUT INCLUDING MFP USAGE FEE OF PERSON $\beta$.<br>3. INSTRUCT MANAGEMENT APPARATUS TO UPDATE PAYMENT COMPLETED FLAG OF DEVICE OPERATION INFORMATION OF PERSON $\beta$ TO INDICATE PAYMENT COMPLETED 1 (=true), WHEN PERSON $\alpha$ HAS PAID BILLING AMOUNT TO WHICH MFP USAGE FEE OF PERSON $\beta$ HAS BEEN ADDED. |
| 1-3 | DEVICE OPERATION INFORMATION EXISTS, IN WHICH mTH REGISTERED OBJECT (HEREINAFTER, "PERSON $\alpha$") HAS PERFORMED OPERATION THAT INCURS FEE AT ELECTRONIC DEVICE 30-1 (MFP), AND PAYMENT COMPLETED FLAG INDICATES PAYMENT COMPLETED 1 (=true) | 1. CALCULATE BILLING AMOUNT TO PERSON $\alpha$, WITHOUT INCLUDING FEE FOR WHICH PAYMENT COMPLETED FLAG INDICATES 1. IF USAGE IN STORE BY PERSON $\alpha$ IS ONLY FOR MFP USAGE FEE, DISPLAY "ALL FEES HAVE ALREADY BEEN PAID". |

FIG.22

| | OUTPUT CONDITION | OPERATION INSTRUCTION |
|---|---|---|
| 2-1 | AUTHENTICATION INFORMATION INPUT AT OTHER ELECTRONIC DEVICE (MFP) BY mTH REGISTERED OBJECT (PERSON $\alpha$) IS AUTHENTICATION INFORMATION THAT CAN BE AUTHENTICATED BY nTH ELECTRONIC DEVICE (ELECTRONIC BLACKBOARD), AND nTH ELECTRONIC DEVICE (ELECTRONIC BLACKBOARD), IS ALREADY USED BY OTHER PERSON. | 1. AUTOMATICALLY AUTHENTICATE PERSON $\alpha$ AT ELECTRONIC BLACKBOARD<br>2. DISPLAY "MR. $\alpha$, AUTOMATIC AUTHENTICATION HAS BEEN PERFORMED" FOR SEVERAL SECONDS ON ELECTRONIC BLACKBOARD<br>3. WHEN PERSON $\alpha$ HAS BEEN INPUTTING INFORMATION AT MFP (FOR EXAMPLE, SCANNING OPERATION), DISPLAY MESSAGE OF "DISPLAY INFORMATION THAT YOU INPUT AT DEVICE ○○ (NAME OF MFP) JUST THEN?" AND SELECTION BUTTON OF YES/NO<br>4. IDENTIFY USAGE LANGUAGE SET AT MFP FROM DEVICE OPERATION HISTORY OF PERSON $\alpha$, AND APPLY TO DISPLAY ON ELECTRONIC BLACKBOARD |
| 2-2 | AUTHENTICATION INFORMATION INPUT AT OTHER ELECTRONIC DEVICE (MFP) BY kTH REGISTERED OBJECT (PERSON $\beta$) IS AUTHENTICATION INFORMATION THAT CAN BE AUTHENTICATED BY nTH ELECTRONIC DEVICE (ELECTRONIC BLACKBOARD).<br>∗ kTH REGISTERED OBJECT (PERSON $\beta$) HAS SAME GROUP ID AS mTH REGISTERED OBJECT (PERSON $\alpha$) | 1. AUTOMATICALLY AUTHENTICATE PERSON $\alpha$ AT ELECTRONIC BLACKBOARD<br>2. DISPLAY "AUTOMATIC AUTHENTICATION HAS BEEN PERFORMED BY AUTHENTICATION INFORMATION OF MR. $\beta$" FOR SEVERAL SECONDS ON ELECTRONIC BLACKBOARD<br>3. WHEN PERSON $\beta$ HAS BEEN INPUTTING INFORMATION (FOR EXAMPLE, SCANNING OPERATION) AT MFP, DISPLAY MESSAGE OF "DISPLAY INFORMATION THAT MR. $\beta$ INPUT AT DEVICE ○○ (NAME OF MFP)?" AND SELECTION BUTTON OF YES/NO |

INFORMATION PROCESSING APPARATUS AND INFORMATION PROCESSING SYSTEM IDENTIFYING FIRST USER OF FIRST ELECTRONIC DEVICE AND SECOND USER OF SECOND ELECTRONIC DEVICE TO TRANSMIT INFORMATION

CROSS-REFERENCE TO RELATED APPLICATION

The present application is based on and claims priority under 35 U.S.C. § 119 to Japanese Patent Application No. 2022-045720, filed on Mar. 22, 2022, and Japanese Patent Application No. 2022-192278, filed on Nov. 30, 2022, the contents of which are incorporated herein by reference in their entirety.

BACKGROUND OF THE INVENTION

1. Field of the Invention

The present invention relates to an information processing apparatus, an information processing system, a device management method, and a recording medium.

2. Description of the Related Art

In cloud computing, there is a technology for implementing single sign-on by linking software. For example, Patent Document 1 discloses an invention that allows a user authenticated by one service to skip the authentication by other services by using a common authentication base among multiple services.

In authentication by hardware such as an electronic device, there is a technology that associates the authentication processes at the respective pieces of hardware with each other. For example, Patent Document 2 discloses an invention that, by linking a system for controlling the entry and exit to an area that includes confidential information with an electronic device located in the area, only a user who has been authenticated by the entry and exit management system is allowed to be authenticated at the electronic device.

When linking the pieces of hardware with each other, it is difficult to determine whether users are the same user. The invention disclosed in Patent Document 2 uses the authentication state of an entry and exit management system for authentication at the electronic device, but each user is required to perform an authentication operation. For example, if it can be determined that a user who has performed authentication at a first electronic device and a user in the vicinity of a second electronic device are the same user, the second electronic device can perform authentication by using the authentication information that has been input by the user in the first electronic device.

Patent Document 1: Japanese Patent No. 6064636
Patent Document 2: Japanese Patent No. 5238409

SUMMARY OF THE INVENTION

According to one aspect of the present invention, there is provided an information processing apparatus including a first image receiver configured to receive, from an imaging apparatus, a first image capturing a first user using a first electronic device, the imaging apparatus and the first electronic device being communicable with the information processing apparatus via a network; a first user identifier configured to identify the first user who has used the first electronic device based on usage information of using the first electronic device and the first image; an input information receiver configured to receive, from the first electronic device, authentication information input to the first electronic device by the first user who is identified by the first user identifier; a second image receiver configured to receive, from the imaging apparatus, a second image capturing a second user existing at an operable position where a second electronic device is operable, the second electronic device being communicable with the information processing apparatus via the network; a second user identifier configured to identify the second user existing at the operable position where the second electronic device is operable, based on the second image; and an operation instructor configured to transmit, to the second electronic device, the authentication information or screen setting information in the authentication information, based on information relating to the first user identified by the first user identifier and the second user identified by the second user identifier and the authentication information.

BRIEF DESCRIPTION OF THE DRAWINGS

FIGS. 7A to 7C illustrate an example of state management information in one embodiment of the present invention;

FIG. 20 illustrates an example of device output information in one embodiment of the present invention;

FIG. 21 illustrates an example of device output information in one embodiment of the present invention; and FIG. 22 illustrates an example of device output information in one embodiment of the present invention.

DESCRIPTION OF THE EMBODIMENTS

Figure 1:
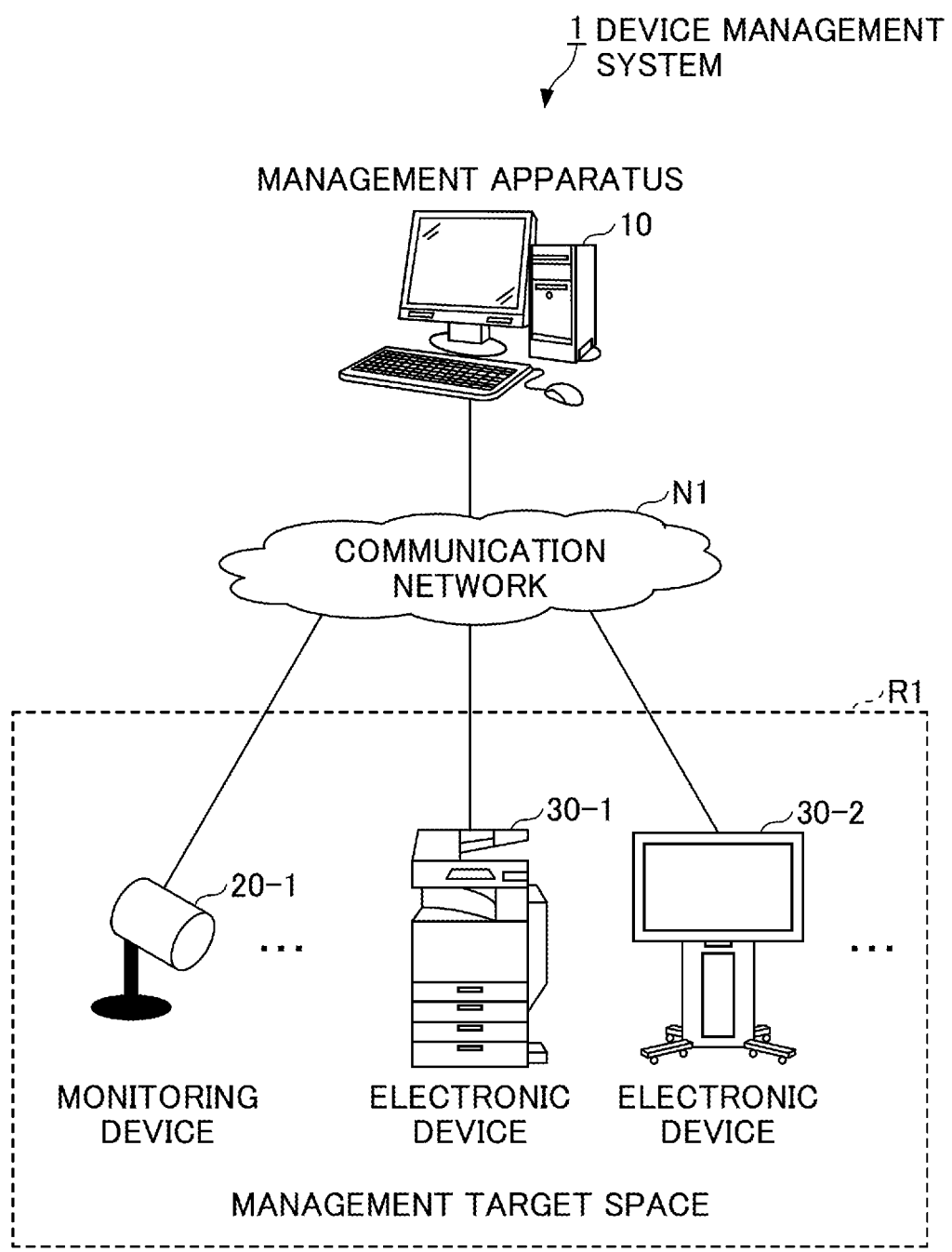
FIG. 1 illustrates an example of the overall configuration of a device management system in one embodiment of the present invention.

A problem to be addressed by an embodiment of the present invention is to set or operate a second electronic device by using information used in a first electronic device.

Hereafter, an embodiment of the present invention will be described in detail with reference to the drawings. In the drawings, elements having the same function will be denoted by the same reference numerals, and duplicate descriptions will be omitted.

EMBODIMENT

An embodiment of the present invention is a device management system that manages multiple electronic devices. The device management system in the present embodiment implements linkage between electronic devices by instructing another electronic device to perform an operation by using information input to one electronic device.

Conventionally, in the linkage between pieces of hardware, it has been determined whether users are the same user by determining that the users are holding the same device (for example, an IC (Integrated Circuit) card or a mobile information terminal). As a result, even if the pieces of hardware are linked with each other, it has been necessary to perform an authentication operation at each piece of hardware. In single sign-on by software linkage, when a user who is authenticated by one service accesses another service, it can easily be determined that the these users are the same user because the operation is performed from the same device.

In the device management system in the present embodiment, a management apparatus tracks a person moving between electronic devices based on an image capturing a space where multiple electronic devices are installed. Thus, the management apparatus can determine whether a user operating one electronic device and a user in the vicinity of another electronic device are the same user.

When users can be determined to be the same user, the operation using the information input to one electronic device can be performed by another electronic device. For example, at an electronic device in the vicinity of the user, by performing authentication by using the authentication information input to another electronic device by the user, single sign-on by hardware linkage can be implemented. Even when authentication is not performed, if it can be confirmed that people are the same person based on a captured image, the device setting information and data can be linked among pieces of hardware used by the same person.

<Overall Configuration of Device Management System>

First, the overall configuration of the device management system in the present embodiment will be described with reference to FIG. 1. FIG. 1 is a diagram illustrating an example of the overall configuration of the device management system in the present embodiment.

As illustrated in FIG. 1, a device management system 1 in the present embodiment includes a management apparatus 10, one or more monitoring devices 20, and multiple electronic devices 30 (examples of a first electronic device and a second electronic device). The management apparatus 10, the monitoring device 20, and the electronic devices 30 are connected to a communication network N1, respectively.

The communication network N1 is configured such that the connected devices can communicate with each other. The communication network N1 is constructed by a network using wired communication such as the Internet, a Local Area Network (LAN), or a Wide Area Network (WAN), for example.

The communication network N1 may include not only a wired communication network but also a wireless communication network such as wireless LAN or short-range wireless communication; or a mobile communication network such as Worldwide Interoperability for Microwave Access (WiMAX), Long Term Evolution (LTE), or 5th Generation (5G).

The monitoring device 20 and the electronic device 30 are installed in a management target space R1. The management target space R1 can be a single space such as a room in a building or multiple spaces connected by a door or accessible spaces such as a hallway.

An example of a management target space R1 is a conference room or an office room in an office. Another example of the management target space R1 is a sales floor or a backyard in a small store such as a convenience store. Another example of the management target space R1 is a lobby or a guest room in a hotel or the like. Another example of the management target space R1 is an airport, a bookstore, or a factory. The management target space R1 is not limited to these and can be any space where electronic devices that can be operated by multiple users are installed.

The management apparatus 10 is an information processing apparatus such as a Personal Computer (PC), a workstation, or server that manages the electronic device 30. The management apparatus 10 transmits an operation instruction to the electronic device 30 based on the image captured by the monitoring device 20. One example of the management apparatus 10 is a computer.

The monitoring device 20 is an electronic device that captures an image including the vicinity of the electronic device 30 installed in the management target space R1. The monitoring device 20 may capture a video (namely, time-series image). The monitoring device 20 is installed at a position where all of the multiple electronic devices 30 can be captured.

One example of the monitoring device 20 is a celestial sphere imaging apparatus. Another example of the monitoring device 20 is a plurality of network cameras. When the monitoring device 20 is a plurality of network cameras, each network camera is arranged with the angle of view adjusted such that there is no blind spot in the management target space R1.

In the following, when there are a plurality of the monitoring devices 20 and when distinguishing each of the multiple monitoring devices 20 from each other, branch numbers such as "monitoring device 20-1", the "monitoring device 20-2", etc., are used.

The electronic devices 30 are various types of electronic devices used by users (examples of a first user and a second user). The electronic devices are configured such that only authenticated users can use the electronic devices 30. The electronic devices 30 are configured such that authentication can be performed by using hardware such as an IC (Integrated Circuit) card.

An example of the electronic device 30 is an image forming apparatus (a printer, a fax machine, an MFP (multifunction peripheral/product/printer: digital MFP), a scanner device, etc.). Another example of the electronic device 30 is a self-service terminal having a fee settlement function or an electronic blackboard (IWB (Interactive White Board: A white board with an electronic blackboard function that enables mutual communication)).

In the following, when distinguishing each of the multiple electronic devices 30 from each other, branch numbers such as "electronic device 30-1" and "electronic devices 30-2" are used.

Note that the electronic device 30 is not limited to an image forming apparatus, a self-service terminal, or an electronic blackboard as long as the device has a communication function. That is, the electronic device 30 may be, for example, a projector (PJ), an output device such as digital signage, a Head Up Display (HUD) device, an industrial machine, an imaging apparatus, a sound collector, a medical device, a network home appliance, an automobile (connected car), a notebook personal computer (PC), a mobile phone, a smartphone, a tablet terminal, a game machine, a personal digital assistant (PDA), a digital camera, a wearable PC, a desktop PC, or the like.

<Hardware Configuration of the Device Management System>

Next, the hardware configuration of each device included in the device management system in the present embodiment will be described with reference to FIGS. 2 to 5.

<<Computer Hardware Configuration>>

Figure 2:
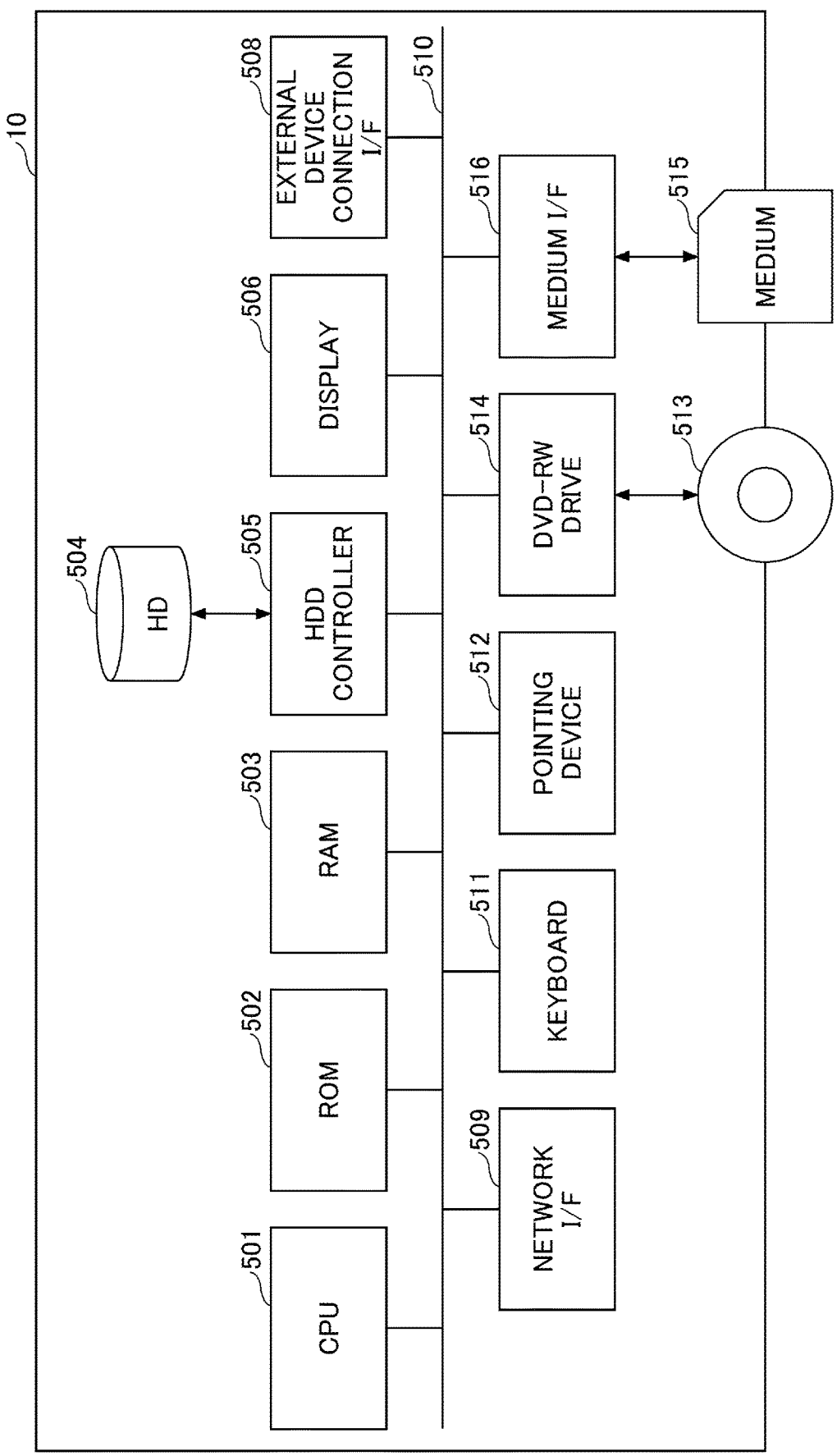
FIG. 2 illustrates an example of the hardware configuration of a computer in one embodiment of the present invention.

FIG. 2 illustrates an example of the hardware configuration when the management apparatus are implemented by a computer.

As illustrated in FIG. 2, the computer in one embodiment includes a Central Processing Unit (CPU) 501, a Read Only Memory (ROM) 502, a Random Access Memory (RAM) 503, a Hard Disk (HD) 504, a Hard Disk Drive (HDD) controller 505, a display 506, an external device connection interface (I/F) 508, a network I/F 509, a bus line 510, a keyboard 511, a pointing device 512, a Digital Versatile Disc Rewritable (DVD-RW) drive 514, and a medium I/F 516.

Among these, the CPU 501 controls the operation of the entire computer. The ROM 502 stores programs used to drive the CPU 501, such as Initial Program Loader (IPL). The RAM 503 is used as a work area for the CPU 501. The HD 504 stores various kinds of data such as programs. The HDD controller 505 controls the reading or writing of various kinds of data from and to the HD 504 according to the control of the CPU 501.

The display 506 displays various kinds of information such as cursors, menus, windows, characters, or images. The external device connection I/F 508 is an interface for connecting various external devices. The external devices in this case are, for example, Universal Serial Bus (USB) memories, printers, etc. The network I/F 509 is an interface for data communication by using the communication network N1. The bus line 510 is an address bus, a data bus, or the like for electrically connecting each element such as the CPU 501 illustrated in FIG. 2.

The keyboard 511 is a kind of input means equipped with multiple keys for input of characters, numbers, various instructions, and the like. The pointing device 512 is a kind of input means for selecting and executing various instructions, selecting a processing object, moving a cursor, and the like. The DVD-RW drive 514 controls the reading or writing of various kinds of data from and to a DVD-RW 513 as an example of a detachable recording medium. The recording medium is not limited to the DVD-RW, and a Digital Versatile Disc Recordable (DVD-R) or the like may be used. The medium I/F 516 controls the reading or writing (storage) of data to a recording medium 515 such as a flash memory.

<<Hardware Configuration of Celestial Sphere Imaging Apparatus>>

Figure 3:
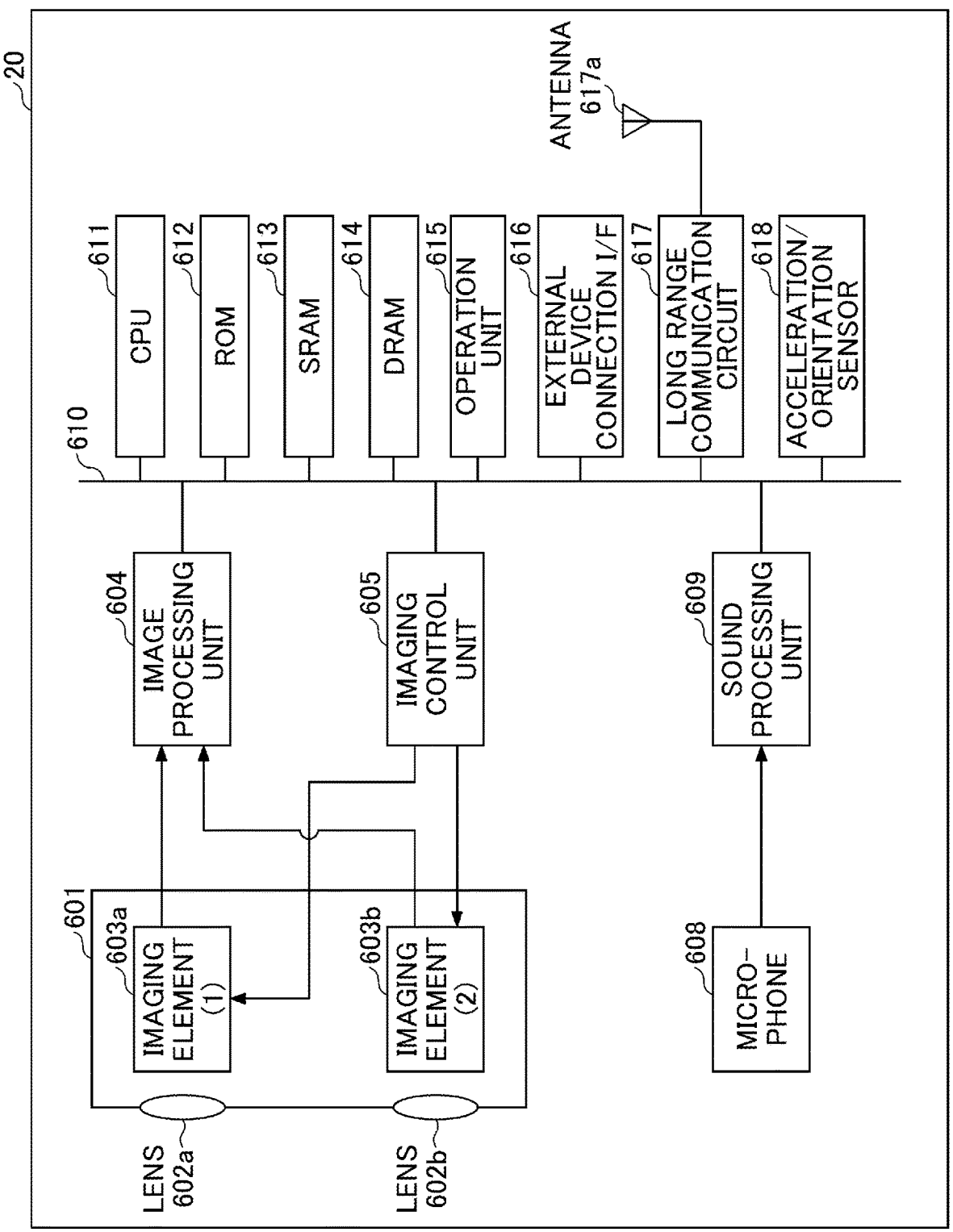
FIG. 3 illustrates an example of the hardware configuration of a celestial sphere imaging apparatus in one embodiment of the present invention.

FIG. 3 is a diagram illustrating an example of the hardware configuration in a case where the monitoring device 20 is implemented by a celestial sphere imaging apparatus. In the following, the celestial sphere imaging apparatus is a celestial sphere (omnidirectional) imaging apparatus using two imaging elements, but any number of imaging elements may be used as long as there are two or more imaging elements. Furthermore, the monitoring device 20 need not be a device exclusively used for omnidirectional imaging, but a retrofitting omnidirectional imaging unit may be attached to a typical digital camera, smartphone, etc., so that the monitoring device has substantially the same function as a celestial sphere imaging apparatus.

As illustrated in FIG. 3, the celestial sphere imaging apparatus in one embodiment includes an imaging unit 601, an image processing unit 604, an imaging control unit 605, a microphone 608, a sound processing unit 609, a central processing unit (CPU) 611, a read only memory (ROM) 612, a static random access memory (SRAM) 613, a dynamic random access memory (DRAM) 614, an operation unit 615, an external device connection I/F 616, a long range communication circuit 617, an antenna 617a, and an acceleration/orientation sensor 618.

Among these, the imaging unit 601 is equipped with wide-angle lenses (what are referred to as fisheye lenses) 602a and 602b each having an angle of view of 180 degrees or more for imaging a hemispherical image, and two imaging elements 603a and 603b provided so as to correspond to the respective wide-angle lenses. The imaging elements 603a and 603b are equipped with image sensors such as a Complementary Metal Oxide Semiconductor (CMOS) sensor and a Charge Coupled Device (CCD) sensor which convert the optical image produced by the fisheye lenses 602a and 602b into the image data of an electric signal and output the image data, a timing generation circuit which generates a horizontal or vertical synchronization signal of the image sensor, the pixel clock, etc., and a group of registers in which various commands and parameters necessary for the operation of the imaging element are set.

The imaging elements 603a and 603b of the imaging unit 601 are each connected to the image processing unit 604 by a parallel I/F bus. On the other hand, the imaging elements 603a and 603b of the imaging unit 601 are connected to the imaging control unit 605 by a serial I/F bus (such as an I2C bus). The image processing unit 604, the imaging control unit 605, and the sound processing unit 609 are connected to the CPU 611 via a bus 610. Also connected to the bus 610 are the ROM 612, the SRAM 613, the DRAM 614, the operation unit 615, the external device connection I/F 616, the long range communication circuit 617, the acceleration/orientation sensor 618, and the like.

The image processing unit 604 takes in the image data output from the imaging elements 603a and 603b through the parallel I/F bus, applies predetermined processing to each piece of image data, and then performs synthesis processing on the pieces of image data to create data of an equidistant cylindrical projection image.

Generally, the imaging control unit 605 sets commands and the like in the group of registers of the imaging elements 603a and 603b by using the I2C bus with the imaging control unit 605 as the master device and the imaging elements 603a and 603b as the slave device. Necessary commands and the like are received from the CPU 611. Further, by using the I2C bus, the imaging control unit 605 takes in the status data and the like of the group of registers of the imaging elements 603a and 603b and sends the status data to the CPU 611.

Further, the imaging control unit 605 instructs the imaging elements 603a and 603b to output image data at the timing when the shutter button of the operation unit 615 is pressed. Some celestial sphere imaging apparatuses have a preview display function or a function to support video display by means of a display (for example, a smartphone display). In this case, the output of image data from the imaging elements 603a and 603b is continuously performed at a predetermined frame rate (frames per minute).

Further, as described later, the imaging control unit 605 functions as a synchronous control means for synchronizing the output timing of image data of the imaging elements 603a and 603b in cooperation with the CPU 611. Note that, in the present embodiment, the celestial sphere imaging apparatus is not provided with a display, but a display unit may be provided.

The microphone 608 converts sound into sound (signal) data. A sound processing unit 609 takes in sound data output from the microphone 608 through an I/F bus and applies predetermined processing to the sound data.

The CPU 611 controls the overall operation of the celestial sphere imaging apparatus and performs necessary processing. The ROM 612 stores various programs for the CPU 611. The SRAM 613 and the DRAM 614 are work memories and store programs executed by the CPU 611, data being processed, etc. In particular, the DRAM 614 stores image data being processed by the image processing unit 604 and data of the processed equidistant cylindrical projection image.

The operation unit 615 is a generic name for operation buttons such as a shutter button 615a. The user inputs various image capturing modes, image capturing conditions, etc., by operating the operation unit 615.

The external device connection I/F 616 is an interface for connecting various external devices. The external device in this case is, for example, a Universal Serial Bus (USB) memory or a Personal Computer (PC). Data of the equidistant cylindrical projection image stored in the DRAM 614 is recorded on a medium externally attached via the external device connection I/F 616, or transmitted to an external terminal (device) such as a smartphone via the external device connection I/F 616 as needed.

The long range communication circuit 617 communicates with an external terminal (device) such as a smartphone via Wi-Fi, Near Field Communication (NFC), Bluetooth (registered trademark), or other short-range wireless communication technologies via the antenna 617a provided in the celestial sphere imaging apparatus. The long range communication circuit 617 can also transmit data of the equidistant cylindrical projection image to an external terminal (device) such as a smartphone.

The acceleration/orientation sensor 618 calculates the orientation of the celestial sphere imaging apparatus from the earth's magnetism and outputs orientation information. This orientation information is an example of related information (metadata) in line with Exif and is used for image processing such as image correction of the captured image. The related information also includes data on the date and time of image capturing and the data volume of the image data. The acceleration/orientation sensor 618 is a sensor that detects the change in angle (roll angle, pitch angle, and yaw angle) associated with the movement of the celestial sphere imaging apparatus. The change in angle is an example of related information (metadata) in line with Exif, and is used for image processing such as image correction of the captured image.

Furthermore, the acceleration/orientation sensor 618 is a sensor for detecting acceleration in three axes directions. The celestial sphere imaging apparatus calculates the posture (angle to the direction of gravity) thereof (the celestial sphere imaging apparatus) based on the acceleration detected by the acceleration/orientation sensor 618. The accuracy of image correction is improved by providing the acceleration/orientation sensor 618 in the celestial sphere imaging apparatus.

<<Hardware Configuration of MFP>>

Figure 4:
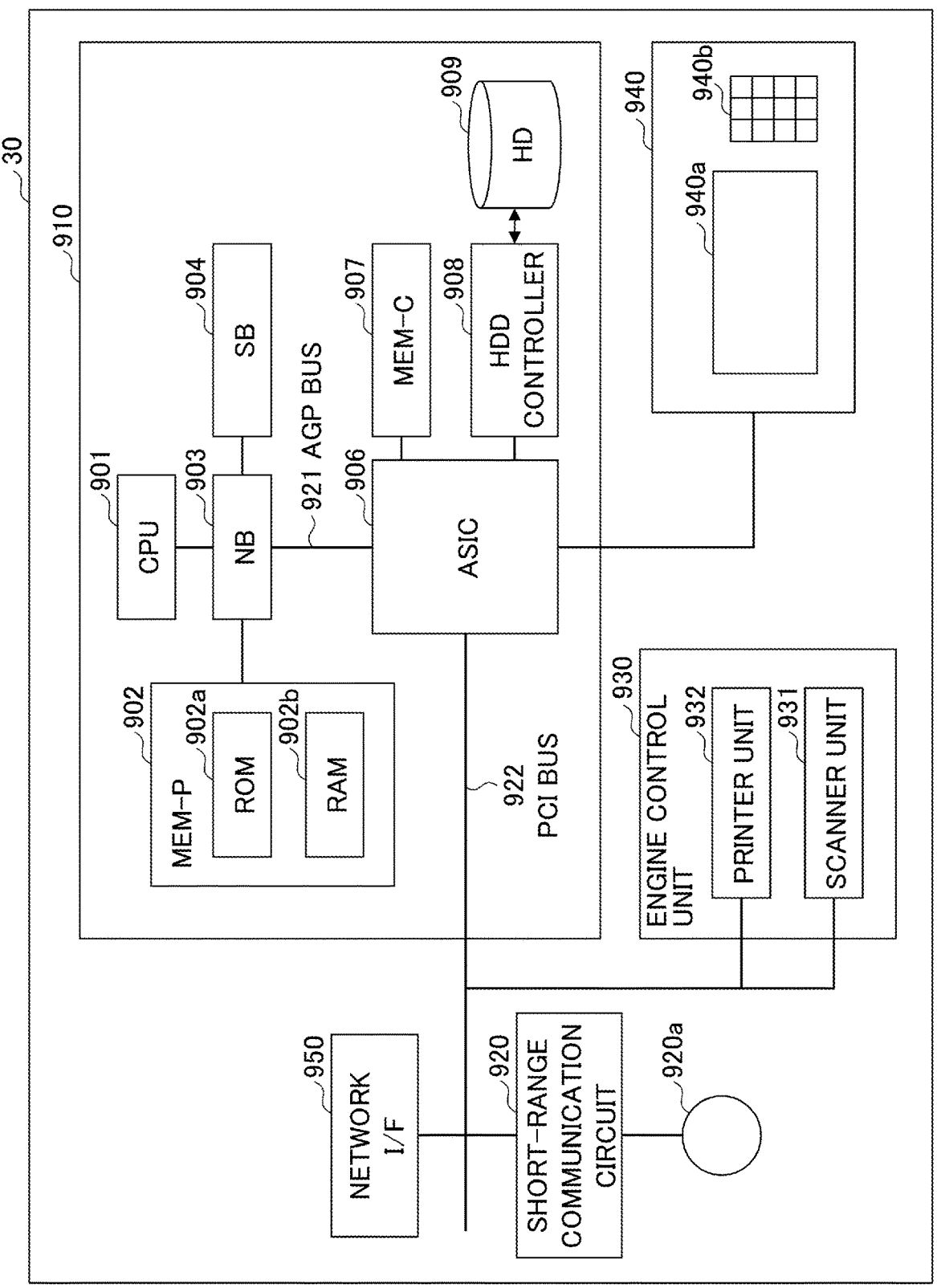
FIG. 4 illustrates an example of the hardware configuration of a multifunction peripheral in one embodiment of the present invention.

FIG. 4 illustrates an example of the hardware configuration in a case where the electronic device 30 is implemented by an MFP.

As illustrated in FIG. 4, the MFP in one embodiment includes a controller 910, a short-range communication circuit 920, an engine control unit 930, an operation panel 940, and a network I/F 950.

Among these, the controller 910 includes a CPU 901, a system memory (MEM-P) 902, a north bridge (NB) 903, a south bridge (SB) 904, an Application Specific Integrated Circuit (ASIC) 906, a local memory (MEM-C) 907, a HDD controller 908, and a HD 909 that is a storage unit, which are the main parts of the computer, and the NB 903 and the ASIC 906 are connected by an Accelerated Graphics Port (AGP) bus 921.

Among these, the CPU 901 is a control unit that performs overall control of the MFP. The NB 903 is a bridge for connecting the CPU 901 with the MEM-P 902, the SB 904, and the AGP bus 921, and has a memory controller that controls reading and writing from and to the MEM-P 902, a Peripheral Component Interconnect (PCI) master, and an AGP target.

The MEM-P 902 includes a ROM (Read Only Memory) 902a, which is a memory for storing programs and data that implement the functions of the controller 910, and a RAM (Random Access Memory) 902b, which is used as a memory for expanding programs and data and for rendering during memory printing. Note that the programs stored in the RAM 902b may be configured to be provided in a file of an installable or executable format by recording the programs on a computer-readable recording medium such as a compact disc read-only memory (CD-ROM), a CD recordable (CD-R), or a Digital Versatile Disc (DVD).

The SB 904 is a bridge for connecting the NB 903 to PCI devices and peripherals. The ASIC 906 is an integrated circuit (IC) for image processing applications with hardware elements for image processing, and serves as a bridge connecting the AGP bus 921, a PCI bus 922, the HDD controller 908, and the MEM-C 907 to each other. The ASIC 906 includes a PCI target and an AGP master, an arbiter (ARB) that forms the core of the ASIC 906, a memory controller that controls the MEM-C 907, multiple Direct Memory Access Controllers (DMACs) that rotate image data by hardware logic, etc., and a PCI unit that transfers data between a scanner unit 931 and a printer unit 932 via the PCI bus 922. A USB (Universal Serial Bus) interface or an IEEE 1394 (Institute of Electrical and Electronics Engineers 1394) interface may be connected to the ASIC 906.

The MEM-C 907 is a local memory used as a copy image buffer and a code buffer. The HD 909 is a storage for storing image data, storing font data used in printing, and storing forms. The HD 909 controls the reading or writing of data from and to the HD 909 according to the control of the CPU 901. The AGP bus 921 is a bus interface for a proposed graphics accelerator card to speed up graphics processing, and can speed up the graphics accelerator card by directly accessing the MEM-P 902 at high throughput.

Further, the short-range communication circuit 920 is equipped with an antenna 920a. The short-range communication circuit 920 is a communication circuit such as NFC, Bluetooth, etc.

Furthermore, the engine control unit 930 includes of the scanner unit 931 and the printer unit 932. Furthermore, the operation panel 940 is equipped with a panel display unit 940a such as a touch panel for displaying current setting values, selection screens, etc., and receiving input from an operator, and an operation panel 940b configured by a numeric keypad for receiving setting values of conditions relating to image formation such as density setting conditions and a start key for receiving copy start instructions. The controller 910 controls the entire MFP and controls rendering, communication, input from the operation panel 940, etc., for example. The scanner unit 931 or the printer unit 932 includes an image processing unit for performing processing such as error diffusion and gamma conversion.

Functions of the MFP can be selected by sequentially switching among a document box function, a copy function, a printer function, and a facsimile function by an application switching key on the operation panel 940. The MFP is set to the document box mode when the document box function is selected, to the copy mode when the copy function is selected, to the printer mode when the printer function is selected, and to the facsimile mode when the facsimile mode is selected.

The network I/F 950 is an interface for data communication by using the communication network N1. The short-range communication circuit 920 and the network I/F 950 are electrically connected to the ASIC 906 via the PCI bus 922.

<<Hardware Configuration of Self-Service Terminal/Electronic Blackboard>>

Figure 5:
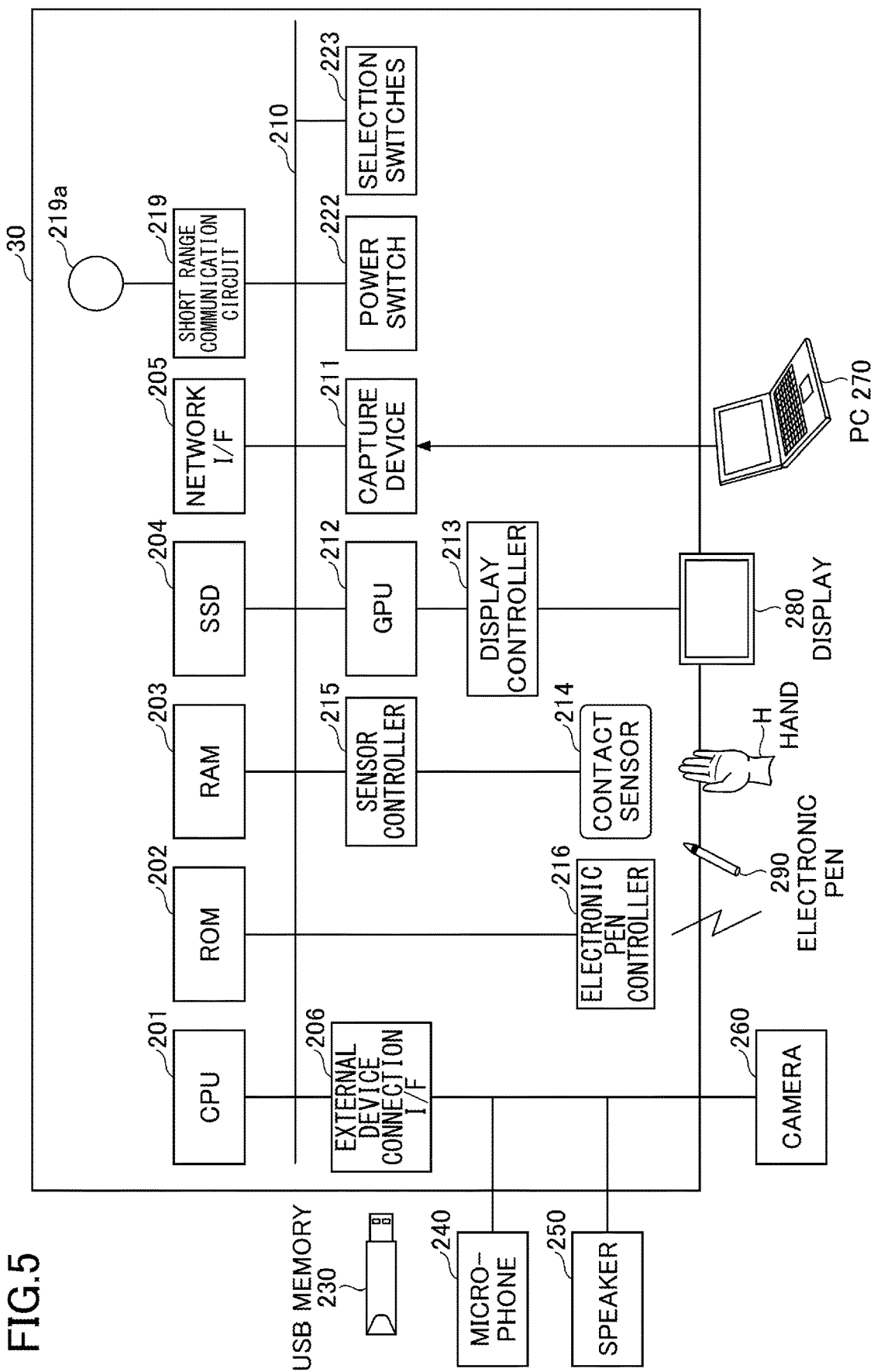
FIG. 5 illustrates an example of the hardware configuration of a self-service terminal/an electronic blackboard in one embodiment of the present invention.

FIG. 5 illustrates an example of the hardware configuration when the electronic device 30 is implemented by a self-service terminal or an electronic blackboard. The hardware of a self-service terminal and an electronic blackboard are similar to each other in terms of display functions, user input functions, etc., and, therefore, both can be covered by the hardware configuration of this example.

As illustrated in FIG. 5, the self-service terminal/electronic blackboard in one embodiment includes a CPU 201, a ROM 202, a RAM 203, a Solid State Drive (SSD) 204, a network I/F 205, and an external device connection I/F 206.

Among these, the CPU 201 controls the operation of the entire self-service terminal/electronic blackboard. The ROM 202 stores programs used to drive the CPU 201, such as Initial Program Loader (IPL). The RAM 203 is used as a work area for the CPU 201. The SSD 204 stores various kinds of data such as programs for the self-service terminal/electronic blackboard. The network I/F 205 controls communication with the communication network N1. The external device connection I/F 206 is an interface for connecting various external devices. The external devices in this case are, for example, a Universal Serial Bus (USB) memory 230 and an external device (a microphone 240, a speaker 250, a camera 260).

The self-service terminal/electronic blackboard is also equipped with a capture device 211, a GPU 212, a display controller 213, a contact sensor 214, a sensor controller 215, an electronic pen controller 216, a short range communication circuit 219, an antenna 219a of the short range communication circuit 219, a power switch 222, and selection switches 223.

Among these, the capture device 211 displays the video information as a still image or a moving image on the display of an external PC (Personal Computer) 270. A Graphics Processing Unit (GPU) 212 is a semiconductor chip that exclusively handles graphics. The display controller 213 controls and manages the screen display in order to output the output image from the GPU 212 to a display 280 or the like.

The contact sensor 214 detects contact of an electronic pen 290, the user's hand H or the like on the display 280. The sensor controller 215 controls the processing of the contact sensor 214. The contact sensor 214 performs the input of coordinates and the detection of coordinates by the infrared blocking method. The method for the input of the coordinates and the detection of the coordinates is that two light receiving and emitting devices installed at both upper ends of the display 280 emit multiple infrared rays in parallel with the display 280, and a light receiving element receives the light that is reflected by the reflecting members installed around the display 280 to return along the same optical path as the optical path of the emitted light. The contact sensor 214 outputs the ID of the infrared rays emitted by the two light receiving and emitting devices blocked by an object, to the sensor controller 215, and the sensor controller 215 identifies the coordinate position, which is the contact position of the object.

The electronic pen controller 216 communicates with the electronic pen 290 to determine the presence or absence of the touch of the pen tip or the touch of the pen bottom to the display 280. The short range communication circuit 219 is a communication circuit such as Near Field Communication (NFC) or Bluetooth (registered trademark). The power switch 222 is a switch for switching on/off the power supply of the self-service terminal/electronic blackboard. The selection switches 223 are, for example, a group of switches for adjusting the contrast, the hue, etc., of the display of the display 280.

Furthermore, the self-service terminal/electronic blackboard is provided with a bus line 210. The bus line 210 is an address bus, a data bus, or the like for electrically connecting each element such as the CPU 201 illustrated in FIG. 5.

Note that the contact sensor 214 is not limited to the infrared blocking system, and various detection means such as a capacitive touch panel for identifying the contact position by detecting a change in the capacitance, a resistive film touch panel for identifying the contact position by a change in the voltage of two opposing resistive films, and an electromagnetic induction touch panel for identifying the contact position by detecting the electromagnetic induction caused by the contact object coming into contact with the display. The electronic pen controller 216 may also determine the presence or absence of touch, not only on the tip and the bottom of the electronic pen 290, but also on the part of the electronic pen 290 gripped by the user and other parts of the electronic pen.

<Functional Configuration of the Device Management System>

Figure 6:
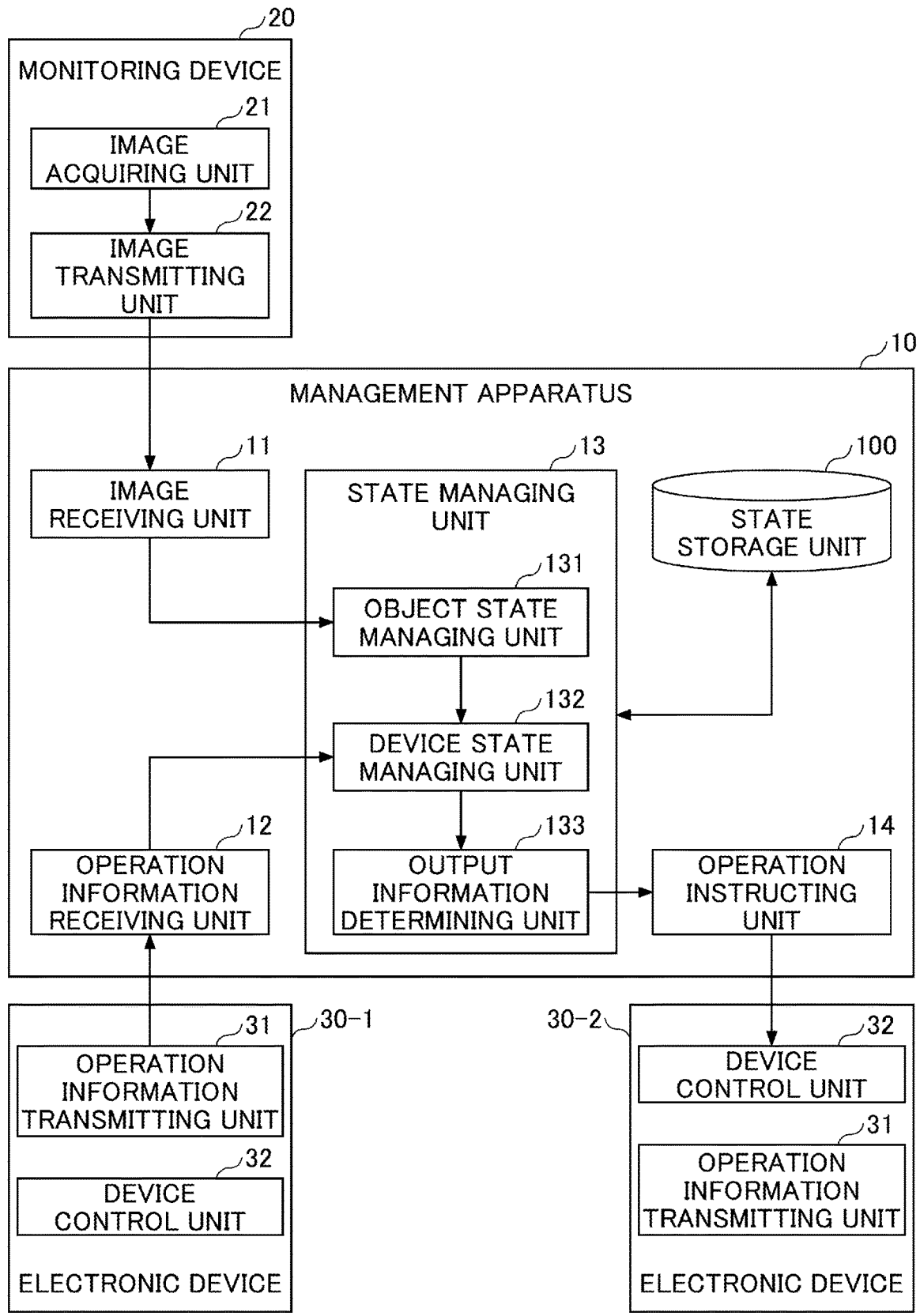
FIG. 6 illustrates an example of the functional configuration of a device management system in one embodiment of the present invention.

Next, an example of the functional configuration of the device management system in the present embodiment will be described with reference to FIG. 6. FIG. 6 is a block diagram illustrating an example of the functional configuration of each device included in the device management system in the present embodiment.

<<Functional Configuration of Management Apparatus>>

As illustrated in FIG. 6, the management apparatus 10 in the present embodiment includes an image receiving unit 11, an operation information receiving unit 12, a state managing unit 13, an operation instructing unit 14, and a state storage unit 100. The state managing unit 13 in the present embodiment includes an object state managing unit 131, a device state managing unit 132, and an output information determining unit 133.

The image receiving unit 11, the operation information receiving unit 12, the state managing unit 13, and the operation instructing unit 14 are implemented, for example, by a process in which a program loaded into the RAM 503 from the HD 504 illustrated in FIG. 2 is executed by the CPU 501 and the HDD controller 505.

The state storage unit 100 is implemented, for example, by using the HD 504 illustrated in FIG. 2. Reading or writing data from or to the HD 504 is performed, for example, via the HDD controller 505.

The state storage unit 100 stores state management information for managing the state of the device and objects existing in the management target space R1. The state management information in the present embodiment includes a registered object list, a registered device list, and a detected object list.

The registered object list is a list that manages information relating to objects existing in the management target space R1. The object in the present embodiment is a person.

The registered device list is a list that manages information relating to the devices existing in the management target space R1. The device in the present embodiment is the electronic device 30.

The detected object list is a list for managing the objects detected in the management target space R1. The detected object list is a temporary list used to update the registered object list.

The state management information in the present embodiment will be described with reference to FIGS. 7A to 7C. FIG. 7A is a conceptual diagram illustrating an example of the registered object list.

As illustrated in FIG. 7A, the registered object list in the present embodiment includes a registered object ID, a group ID, an existence confirmation flag, attribute information, and device operation information.

The registered object ID is identification information identifying an object included in the registered object list.

The group ID is identification information identifying a group to which multiple registered objects belong. The group ID is given when it is determined that some of the registered objects included in the registered object list belong to the same group. An initial value (e.g. zero) is set for the group ID of a registered object that is not determined to belong to a group.

Each group includes, for example, co-workers, parents and children, or friends. Members belonging to a group jointly carry out jobs such as having a meeting or shopping. Therefore, it is expected that by recognizing a group, the action of a person can be identified more accurately. For example, when a parent and a child are present in an unmanned store, it would be more convenient if the parent can settle the articles picked up by the child at the same time when settling the bill. Further, when multiple employees have a meeting in a conference room equipped with an MFP and an electronic blackboard, it would be convenient if one employee performs authentication with the MFP, the authentication can be omitted when another employee uses the electronic blackboard.

The existence confirmation flag is a flag indicating whether the registered object exists in the management target space R1. For example, the existence confirmation flag is set to 1 if the registered object exists in the management target space R1, and is set to 0 if the registered object does not exist in the management target space R1.

The attribute information is information that accompanies the registered object and is necessary for management. In the present embodiment, the attribute information is the position of the registered object and the time when the position has been confirmed (hereafter also referred to as "image acquisition time"). The position of the registered object is expressed by three-dimensional coordinates (that is, values on each axis in a orthogonal coordinate system, such as the X, Y, and Z axes).

The method of acquiring position information varies depending on the type of the monitoring device 20. For example, if the monitoring device 20 is a network camera, publicly known techniques such as acquiring the distance to an object by a stereo camera and mapping the distance to three-dimensional coordinates along with the direction can be used.

In addition to the position of the registered object, the attribute information may include various kinds of information indicating the characteristics of the registered object. For example, the color or shape of the registered object may be used. If the object is a person, it is preferable to use color because the shape varies with the posture. The number of color types or the area of each color also varies according to the posture, and, therefore, when determining whether the object is identical or not, it is preferable to make it a condition whether at least one color is continuous.

The device operation information is information about the device operation performed by the registered object. The device operation information may include input information input by the user in the device operation. The device operation information includes, for example, functions performed by the user on the electronic device, the operation time, fee information of the fee in exchange for the operation, payment completed flag information (described below) indicating that the fee that is associated with each piece of fee information in a one-to-one manner has already been paid, the usage language (language to be used), etc. The input information includes authentication information in the authentication operation or setting information in the device setting operation.

The number of objects existing in management target space R1 changes from time to time. Therefore, the number of registered objects included in the list of registered objects is variable.

FIG. 7B is a conceptual diagram illustrating an example of the registered device list. As illustrated in FIG. 7B, the registered device list in the present embodiment includes a registered device ID, attribute information, device input information, and device output information as data items.

The registered device ID is identification information identifying devices included in the registered device list.

Attribute information is information that accompanies a registered device and is necessary for management. In the present embodiment, the attribute information includes information such as the position of the registered device, the power on/off status, whether the device is in sleep mode, whether authentication is required, the option installment status, state information expressing during maintenance/ scheduled maintenance time/during energy saving mode, etc. The position of the registered device is expressed by three-dimensional coordinates similar to the registered object.

The device input information (hereinafter, also referred to as "usage information") is predetermined information that is managed when the registered device is operated. The device input information may include input information input by the user in the device operation. The device input information may be, for example, a function executed by the user on the registered device, the operation time, the fee information of the fee to be charged in exchange for the operation, etc. The device input information may include screen setting information set by the user in the device operation. The screen setting information is, for example, the usage language, the font of the characters used, the size of the characters used, etc.

The device output information is pre-registered information for the registered device. The device output information is a list that associates the output condition that triggers the transmission of the operation instruction, with the operation instruction to be transmitted to the registered device when the output condition is satisfied.

The number of devices installed in the management target space R1 may change. Therefore, the number of registered devices included in the registered device list is variable.

FIG. 7C is a conceptual diagram illustrating an example of the detected object list. As illustrated in FIG. 7C, the detected object list in the present embodiment includes a detected object ID, a group ID, and attribute information as data items.

The detected object ID is identification information identifying objects included in the detected object list.

The group ID is identification information that identifies a group including multiple detected objects. The group ID is given when it is determined that some of the detected objects included in the detected object list belong to the same group. An initial value (e.g., zero) is set for a group ID of detected objects that are not determined to belong to a group.

The attribute information is information that accompanies a detected object and is necessary for management. In the present embodiment, the attribute information is the position of the detected object and the image acquisition time. The position of the detected object is expressed by three-dimensional coordinates, similar to the registered object.

The number of objects detected in the management target space R1 changes from time to time. Therefore, the number of detected objects in the detected object list is variable.

Referring back to FIG. 6, further explanations will be given. The image receiving unit 11 receives an image from the monitoring device 20. The image receiving unit 11 sends the received image to the state managing unit 13 in response to a request from the state managing unit 13. The image receiving unit 11 is an example of a first image receiving unit and a second image receiving unit. The first image receiving unit and the second image receiving unit may be configured by one software module or multiple software modules. The image receiving unit 11 receives, for example, a first image capturing a first user using the first electronic device, by the first image receiving unit. Further, the image receiving unit 11 receives, for example, a second image capturing a second user existing in an operable position of the second electronic device from the imaging apparatus, by the second image receiving unit.

The operation information receiving unit 12 receives device operation information from the electronic device 30. The operation information receiving unit 12 sends the received device operation information to the state managing unit 13 in response to a request from the state managing unit 13. The operation information receiving unit 12 is an example of an input information receiving unit. For example, the operation information receiving unit 12 receives, from the first electronic device, authentication information input at the first electronic device, by the first user identified by the first user identifying unit. Further, for example, the operation information receiving unit 12 receives, from the first electronic device, usage information relating to using the first electronic device by the first user identified by the first user identifying unit, for example.

The state managing unit 13 manages the states of the electronic device 30 and objects by using the object state managing unit 131 and the device state managing unit 132. The state managing unit 13 uses the output information determining unit 133 to determine the content of the operation instruction to be transmitted to the electronic device 30. The state managing unit 13 is an example of the first user identifying unit and the second user identifying unit. The first user identifying unit and the second user identifying unit may be configured by one software module or multiple software modules. The state managing unit 13 identifies a first user who has used the first electronic device based on the usage information of using the first electronic device and the first image. Further, the state managing unit 13 identifies a second user who exists in an operable position of the second electronic device from the second image. This processing is executed by using the following object state managing unit 131 and the device state managing unit 132.

The object state managing unit 131 updates the registered object list stored in the state storage unit 100 based on the image received from the image receiving unit 11. For example, the object state managing unit 131 identifies the first user based on the first image. Further, for example, the object state managing unit 131 identifies the second user existing in the operable position of the second electronic device from the second image. Details of the processing will be described later.

The device state managing unit 132 updates the registered device list and registered object list stored in the state storage unit 100 based on the device operation information received from the operation information receiving unit 12. For example, the device state managing unit 132 identifies the first user who has used the first electronic device based on the usage information of using the first electronic device and the first image. Details of the processing will be described later.

The output information determining unit 133 determines the content of the operation instruction to be transmitted to the electronic device 30 based on the state management information stored in the state storage unit 100. The output information determining unit 133 sends the determined operation instruction to the operation instructing unit 14.

The operation instructing unit 14 sends the operation instruction received from the state managing unit 13 to the electronic device 30. For example, based on the information and authentication information of the first user identified by the first user identifying unit and the second user identified by the second user identifying unit, the operation instructing unit 14 instructs the second electronic device to operate by using the authentication information or the screen setting information in the authentication information when a predetermined condition is satisfied. Also, based on the information and usage information of the first user identified by the first user identifying unit and the second user identified by the second user identifying unit, for example, the operation instructing unit 14 instructs the second electronic device to operate using the usage information when a predetermined condition is satisfied.

For example, the predetermined condition is that device operation information exists, in which the first user has performed an operation that incurs a fee at the first electronic device, and payment of the fee is not completed. In this case, the operation instructing unit 14 instructs the second electronic device to perform an operation of displaying or adding the usage fee of the first electronic device to the billing amount to be presented to the first user.

Further, for example, the predetermined condition is that device operation information exists, in which another user having the same group ID as the first user has performed an operation that incurs a fee at the first electronic device, and payment of the fee is not completed. In this case, the operation instructing unit 14 instructs the second electronic device to perform an operation of adding the usage fee of the first electronic device relating to the other user to the billing amount to be presented to the first user and displaying the amount after the addition, or an operation of displaying an option indicating that the other user, not the first user, will pay the usage fee of the first electronic device relating to the other user.

Further, for example, the predetermined condition is that device operation information exists, in which the first user has performed an operation that incurs a fee at the first electronic device, and payment of the fee has been completed. In this case, the operation instructing unit 14 instructs the second electronic device to perform an operation of displaying the billing amount to be charged to the first user, without including the paid fee.

Further, for example, the predetermined condition is that device operation information exists, in which the first user has performed an operation of logging in at the first electronic device, the authentication information input by the first user at the first electronic device can be authenticated at the second electronic device, and login is not performed at the second electronic device. In this case, the operation instructing unit 14 instructs the second electronic device to perform an operation of logging in by using the authentication information input at the first electronic device by the first user.

Further, for example, the predetermined condition is that device operation information exists, in which another user having the same group ID as the first user has performed an operation of logging in at the first electronic device, the authentication information input by the other user at the first electronic device can be authenticated at the second electronic device, and login is not performed at the second electronic device. In this case, the operation instructing unit 14 instructs the second electronic device to perform an operation of logging in by using the authentication information input at the first electronic device by the other user.

Furthermore, the operation instructing unit 14 instructs the second electronic device to perform an operation of displaying an option indicating to display the information input to the first electronic device, when the device operation information includes an operation to input information to the first electronic device.

<<Functional Configuration of Monitoring Device>>

As illustrated in FIG. 6, the monitoring device 20 in the present embodiment includes an image acquiring unit 21 and an image transmitting unit 22.

The image acquiring unit 21 acquires an image including the vicinity of the electronic device 30 installed in the management target space R1. The image acquiring unit 21 is implemented, for example, by a process in which a program loaded into the SRAM 613 from the ROM 612 illustrated in FIG. 3 is executed by the CPU 611 and the imaging control unit 605.

The image transmitting unit 22 transmits the image acquired by the image acquiring unit 21 to the management apparatus 10. The image transmitting unit 22 is implemented, for example, by a process in which a program loaded into the SRAM 613 from the ROM 612 illustrated in FIG. 3 is executed by the CPU 611 and the external device connection I/F 616.

<<Functional Configuration of Electronic Device>>

As illustrated in FIG. 6, the electronic device 30 in the present embodiment includes an operation information transmitting unit 31 and a device control unit 32.

The operation information transmitting unit 31 and the device control unit 32 are implemented, for example, by a process that is caused to be executed by the CPU 901 and the HDD controller 908 by a program loaded to the RAM 902b from the HD 909 illustrated in FIG. 4.

The operation information transmitting unit 31 transmits device operation information relating to the operation performed by the user to the management apparatus 10.

The device control unit 32 receives an operation instruction from the management apparatus 10. The device control unit 32 controls the operation of the electronic device 30 based on the received operation instruction. For example, the device control unit 32 authenticates the user by using the authentication information included in the operation instruction. For example, the device control unit 32 changes the setting of the electronic device 30 by using the setting information included in the operation instruction.

<Processing Procedure of Device Management Method>

Next, the device management method executed by the device management system in the present embodiment will be described with reference to FIGS. 8 to 20.

<<Basic Flowchart>>

The device management method in the present embodiment includes many double-loop processes that process all combinations of each of the pieces of data included in a certain list. Therefore, in the present embodiment, a basic flowchart illustrating the framework of the double-loop process is introduced, and the following explanation focuses on the processes in the basic flowchart. Each process in the basic flowchart is a process performed on one combination of two pieces of data.

The basic flowchart in the present embodiment includes two basic flowcharts. The first basic flowchart is used when two pieces of data included in different lists are subjected to a double-looped process. The second basic flowchart is used when two pieces of data included in the same list are subjected to a double-looped process.

Figure 8:
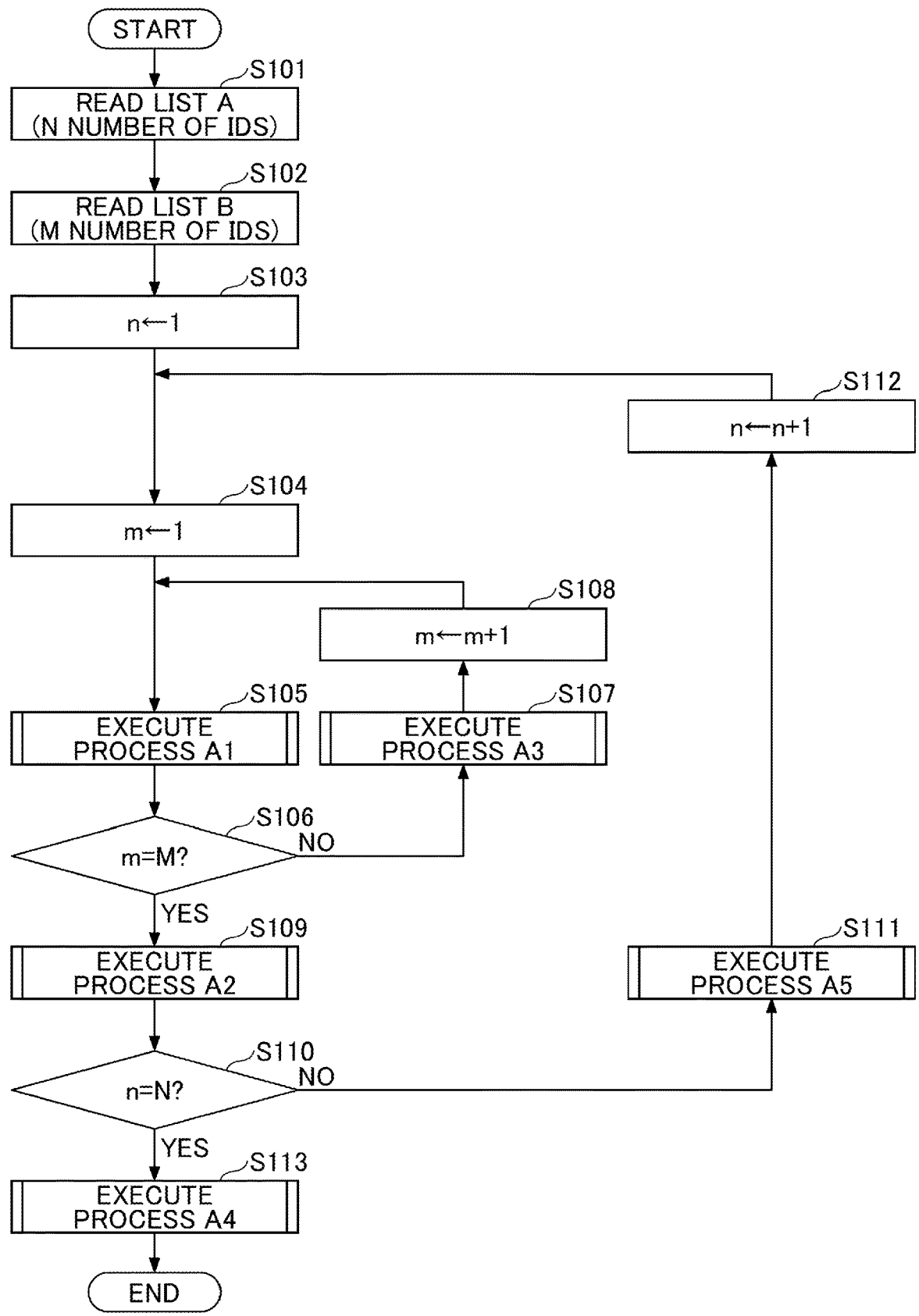
FIG. 8 illustrates an example of a first basic flowchart in one embodiment of the present invention.

FIG. 8 is a flowchart illustrating an example of the first basic flowchart in the present embodiment.

In step S101, list A is read out. The number of pieces of data in list A is N. In step S102, list B is read. The number of pieces of data in list B is M.

In step S103, a variable n is initialized to 1. In step S104, a variable m is initialized to 1. In step S105, process A1 is executed.

In step S106, it is determined whether the variable m is equal to the number of pieces of data M. This means whether the n-th piece of data in list A has been processed in combination with all of the pieces of data in list B. When the variable m is different from the number of pieces of data M (NO), the process proceeds to step S107. When the variable m is equal to the number of pieces of data M (YES), the process proceeds to step S109.

In step S107, process A3 is executed. In step S108, the variable m is incremented. Then, the process returns to step S106.

In step S109, process A2 is executed. In step S110, it is determined whether the variable n is equal to the number of pieces of data N. This means whether all of the pieces of data in list A have been processed in combination with all of the pieces of data in list B. When the variable n is different from the number of pieces of data N (NO), the process proceeds to step S111. When the variable n is equal to the number of pieces of data N (YES), the process proceeds to step S113.

In step S111, process A5 is executed. In step S112, the variable n is incremented. Then, the process returns to step S104.

In step S113, process A4 is executed. Accordingly, processing is completed for all combinations of data included in lists A and B.

Figure 9:
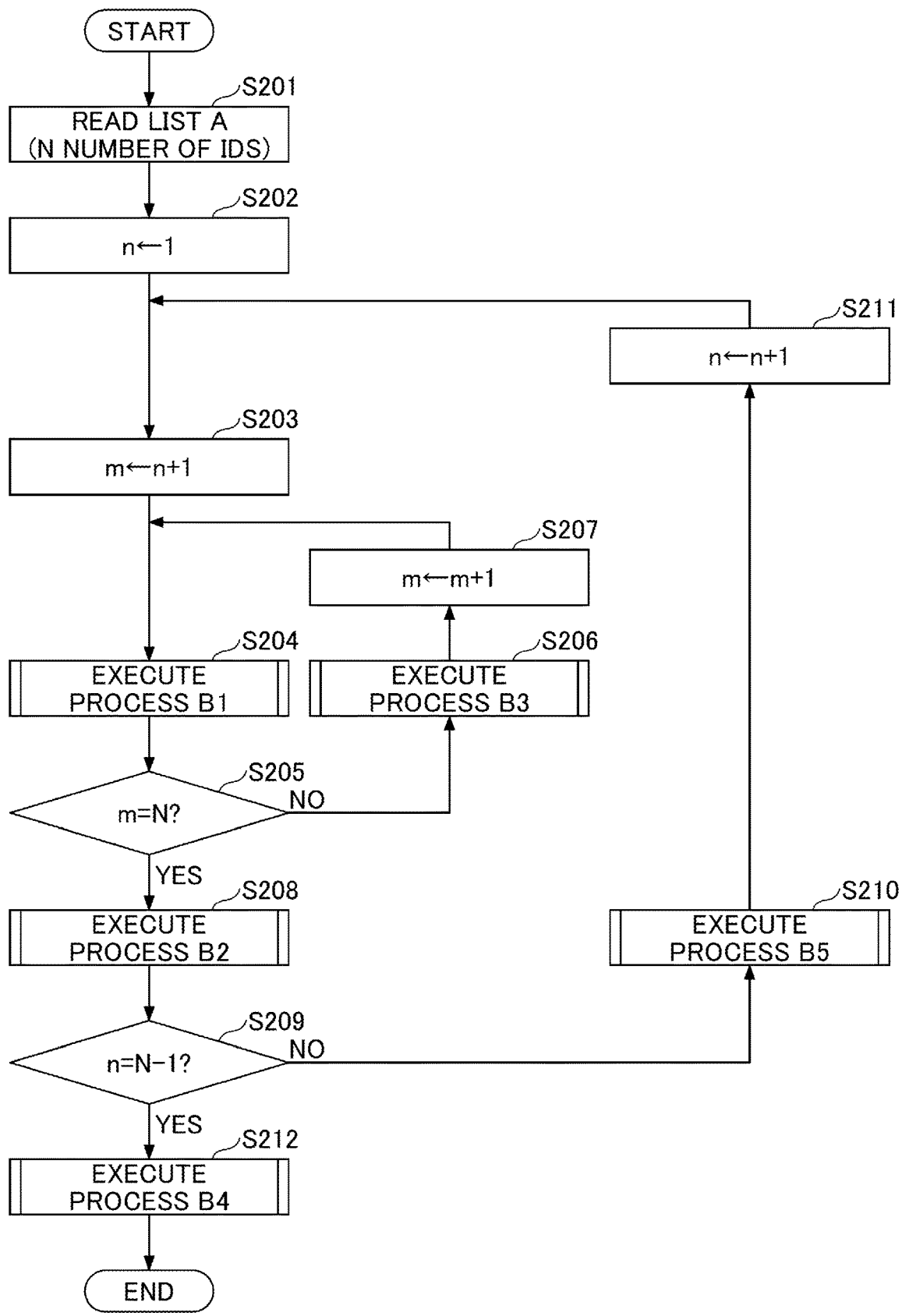
FIG. 9 illustrates an example of a second basic flowchart in one embodiment of the present invention.

FIG. 9 is a flowchart illustrating an example of the second basic flowchart in the present embodiment.

In step S201, list A is read out. The number of pieces of data in list A is N.

In step S202, a variable n is initialized to 1. In step S203, n+1 is applied to the variable m. In step S204, process B1 is executed.

In step S205, it is determined whether the variable m is equal to N. This means whether the n-th piece of data in list A has been processed in combination with all of the pieces of data in list A. When the variable m is different from N (NO), the process proceeds to step S206. When the variable m is equal to N (YES), the process proceeds to step S208.

In step S206, process B3 is executed. In step S207, the variable m is incremented. Then, the process returns to step S204.

In step S208, process B2 is executed. In step S209, it is determined whether the variable n is equal to N−1. This means whether all of the pieces of data in list A have been processed in combination with all of the other pieces of data in list A. When the variable n is different from N−1 (NO), the process proceeds to step S210. When the variable n is equal to N−1 (YES), the process proceeds to step S212.

In step S210, process B5 is executed. In step S211, variable n is incremented. Then, the process returns to step S203.

In step S212, process B4 is executed. Accordingly, the process for all combinations of data included in list A is completed.

<<Device Management Method>>

Figure 10:
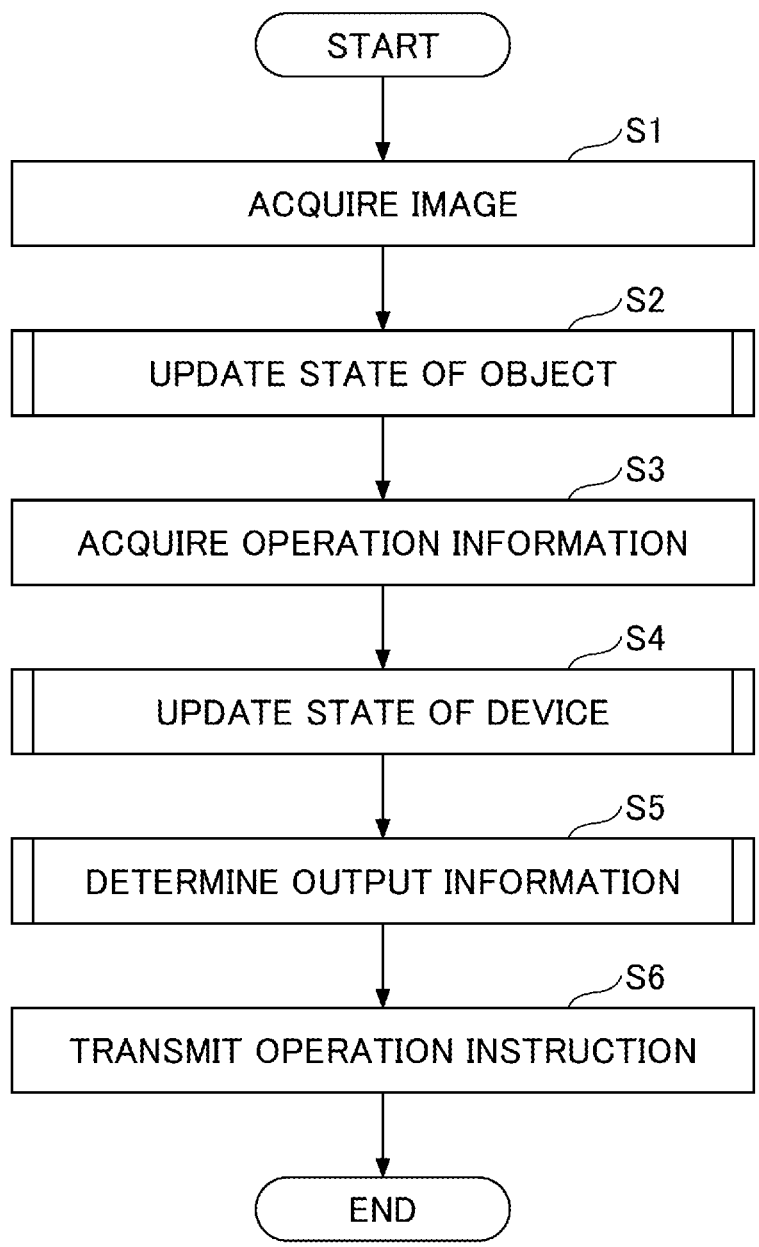
FIG. 10 illustrates an example of an device management method in one embodiment of the present invention.

FIG. 10 is a flow chart illustrating an example of the device management method executed by the device management system in the present embodiment.

The device management system repeatedly executes the flow chart illustrated in FIG. 10 at predetermined time intervals. The time intervals can be set to any interval, for example, three seconds.

In step S1, the image acquiring unit 21 provided in the monitoring device 20 acquires a first image capturing the vicinity of the electronic device 30-1. Further, the image acquiring unit 21 acquires a second image capturing the vicinity of the electronic device 30-2. The monitoring device 20 is installed such that the vicinity of the electronic device 30-1 and the electronic device 30-2 installed in the management target space R1 are included in the angle of view. Therefore, the vicinity of the electronic device 30-1 is captured in the first image acquired by the image acquiring unit 21. Further, the vicinity of the electronic device 30-2 is captured in the second image acquired by the image acquiring unit 21.

The vicinity of the electronic device 30-1 or the electronic device 30-2 is the range of positions where the user can operate the electronic device 30-1 or the electronic device 30-2 (hereinafter, also referred to as "operable position"). The operable position is the position where the user can reach the electronic device 30-1 or the electronic device 30-2. The operable position is the position within 1 meter from, for example, the electronic device 30-1 or the electronic device 30-2. Therefore, the first image is an image capturing the electronic device 30-1 and the user using the electronic device 30-1. The second image is an image capturing the electronic device 30-2 and the user using the electronic device 30-2.

If the operable positions of the electronic device 30-1 and the electronic device 30-2 can be captured in one image, the operable positions of the electronic device 30-1 and the electronic device 30-2 may be captured in one image. In this case, the first image and the second image are the same image.

The first and second images acquired by the image acquiring unit 21 are not limited to still images and may be moving images.

Next, the image acquiring unit 21 sends the acquired first image and second image to the image transmitting unit 22. The image transmitting unit 22 receives the first image and the second image from the image acquiring unit 21. Next, the image transmitting unit 22 transmits the received first image and second image to the management apparatus 10. In the management apparatus 10, the image receiving unit 11 receives the first image and second image from the monitoring device 20.

In step S2, the state managing unit 13 provided in the management apparatus 10 requests the first and second images from the image receiving unit 11. Next, the state managing unit 13 inputs the first and second images received from the image receiving unit 11 to the object state managing unit 131.

Subsequently, the object state managing unit 131 executes an object state updating process described later to update the registered object list in the state management information stored in the state storage unit 100. When there are multiple monitoring devices 20, the object state managing unit 131 executes the object state updating process for each of the multiple images received from each of the multiple monitoring devices 20.

<<Object State Updating Process>>

Figure 11:
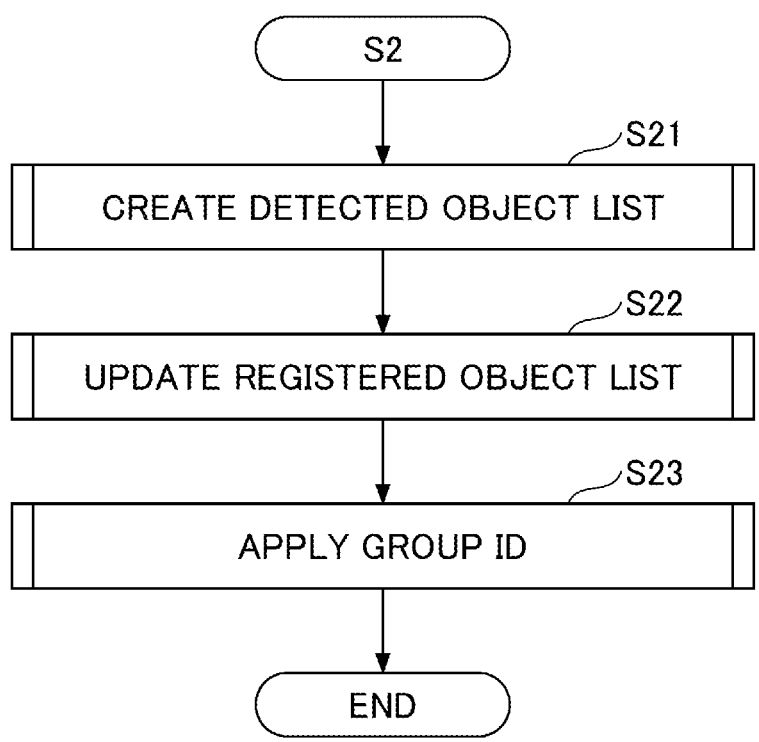
FIG. 11 illustrates an example of an object state updating process in one embodiment of the present invention.

The object state updating process in the present embodiment will be described with reference to FIGS. 11 to 16. FIG. 11 is a flowchart illustrating an example of the object state updating process (step S2 in FIG. 10) executed by the object state managing unit 131 in the present embodiment.

In step S21, the object state managing unit 131 executes a detected object list creating process described later and creates a detected object list based on the image input from the state managing unit 13.

Figure 12:
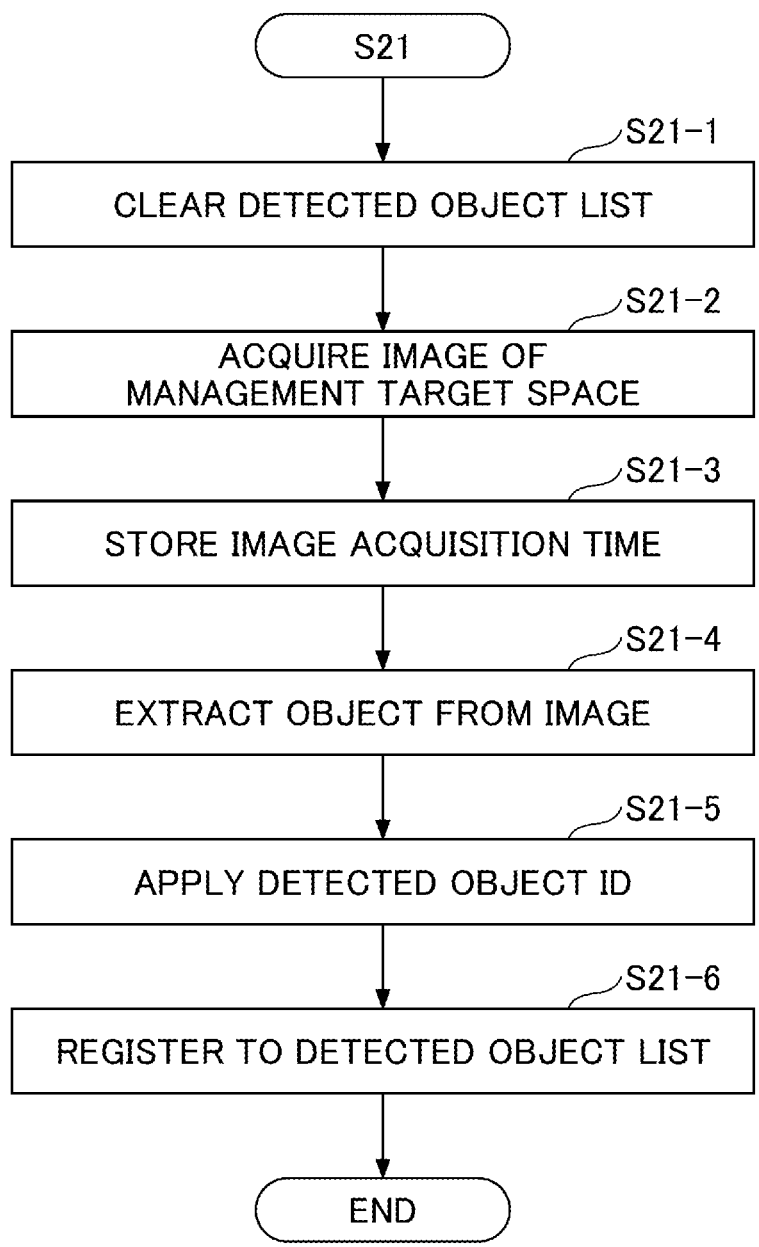
FIG. 12 illustrates an example of a detected object list creating process in one embodiment of the present invention.

FIG. 12 is a flowchart illustrating an example of the detected object list creating process (step S21 in FIG. 11) executed by the object state managing unit 131 in the present embodiment.

In step S21-1, the object state managing unit 131 clears the detected object list stored in the state storage unit 100. That is, all of the pieces of data included in the detected object list are deleted.

In step S21-2, the object state managing unit 131 acquires an image input from the state managing unit 13. The image may be one image received from one monitoring device 20 or multiple images received from multiple monitoring devices 20.

Next, the object state managing unit 131 divides the image into predetermined blocks. Subsequently, for each block, the object state managing unit 131 measures the distance between the camera and the object captured in the image. Furthermore, the object state managing unit 131 obtains three-dimensional coordinates from the measured distance. As the method for converting the distance into three-dimensional coordinates, a known method may be used.

In step S21-3, the object state managing unit 131 acquires the image acquisition time T from the acquired image. If the image acquisition time cannot be acquired from the image, the current time may be acquired as the image acquisition time T.

In step S21-4, the object state managing unit 131 analyzes the acquired image and detects the object captured in the image. In the present embodiment, the person captured in the image is detected.

The detection of the person can be done by using a known technique. For example, pattern matching using a machine learning model can be used. Specifically, a known region-based convolutional neural network (R-CNN) or the like can be used to cut out a person from an image.

Furthermore, the accuracy of detection can be improved by pattern-matching the cut out image of the person with a prestored comparison image. Note that other than these methods, various known person detection methods can be used.

In step S21-5, the object state managing unit 131 applies a detected object ID that identifies the detected object.

In step S21-6, the object state managing unit 131 registers the detected object ID and attribute information (the position of the detected object and the image acquisition time) in the detected object list. At this stage, an initial value indicating that the object does not belong to a group is set as the group ID.

Referring back to FIG. 11, further explanations will be given. In step S22, the object state managing unit 131 executes a registered object list updating process described later and updates the registered object list based on the detected object list.

Figure 13:
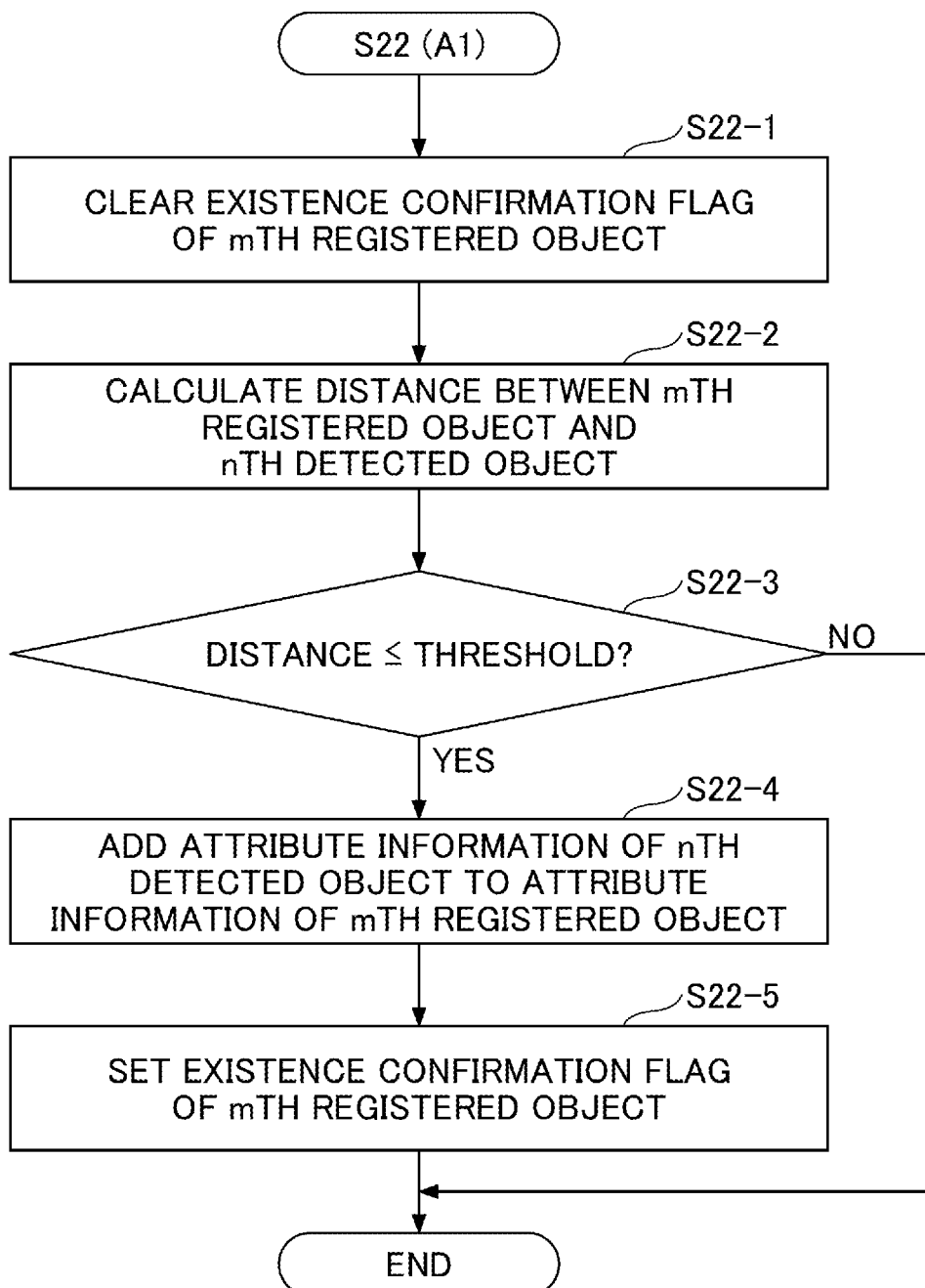
FIG. 13 illustrates an example of a registered object list updating process in one embodiment of the present invention.
Figure 14:
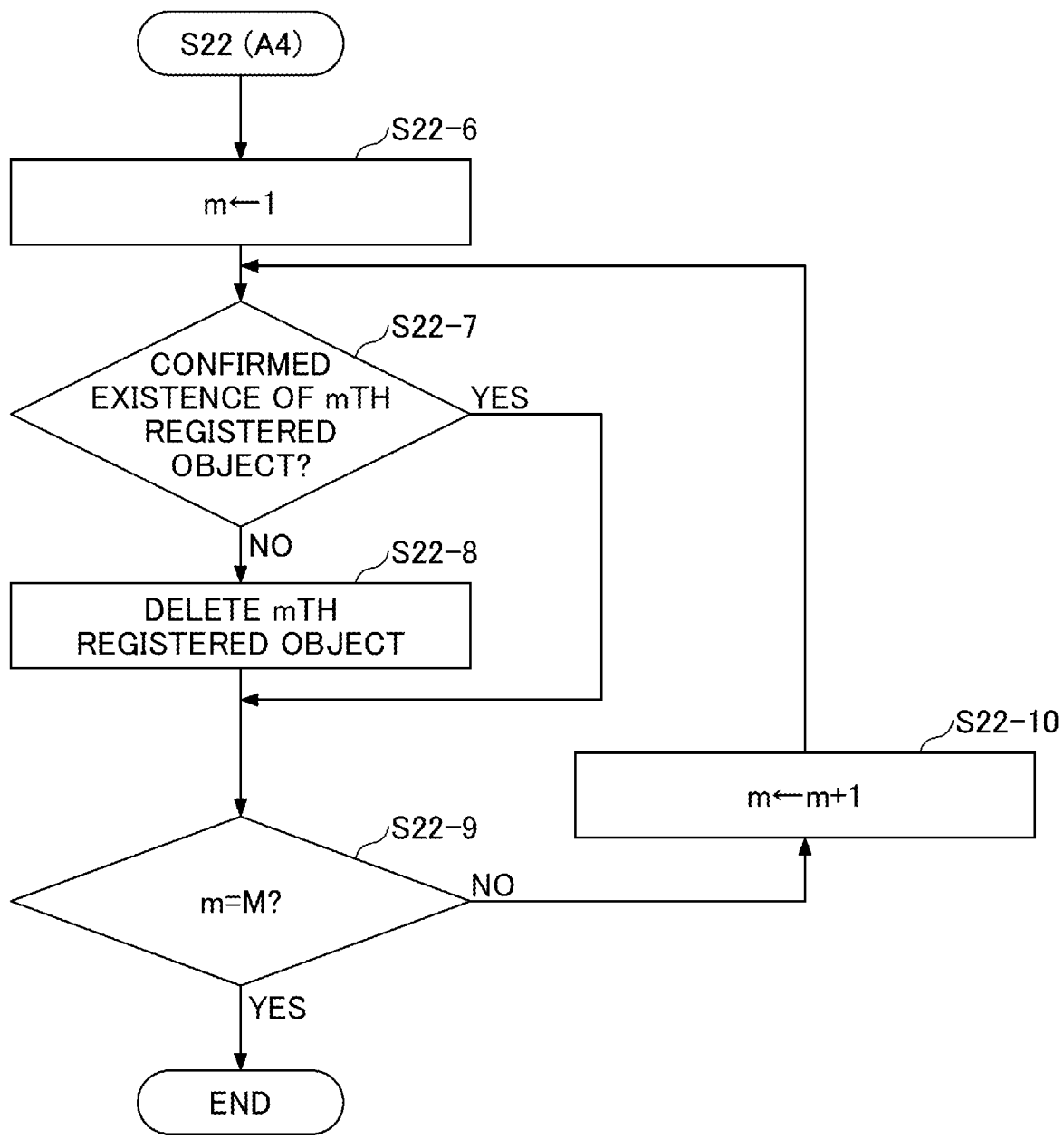
FIG. 14 illustrates an example of a registered object list updating process in one embodiment of the present invention.

FIG. 13 and FIG. 14 are flowcharts illustrating an example of the registered object list updating process (step S22 in FIG. 11) executed by the object state managing unit 131 in the present embodiment.

The registered object list updating process is executed in the framework of the first basic flowchart (see FIG. 8). Specifically, process A1 (FIG. 13) and process A4 (FIG. 14) are executed for all combinations of detected objects and registered objects, with the detected object list as list A and the registered object list as list B. Note that there is no process corresponding to processes A2, A3 and A5.

FIG. 13 is a flowchart illustrating an example of process A1 of the registered object list updating process. Process A1 is process for determining that the registered object and the detected object are the same and for updating the position of the registered object.

Here, processing is executed on the combination of the n-th detected object in the detected object list and the m-th registered object in the registered object list.

In step S22-1, the object state managing unit 131 clears the existence confirmation flag of the m-th registered object. That is, zero is set in the existence confirmation flag of the m-th registered object. This means that it is unknown whether the registered object exists in the management target space R1.

In step S22-2, the object state managing unit 131 calculates the distance X between the three-dimensional coordinates of the m-th registered object and the three-dimensional coordinates of the n-th detected object.

In step S22-3, the object state managing unit 131 determines whether the distance X is less than or equal to a predetermined threshold (for example, one meter). When the distance X exceeds the threshold (NO), the object state managing unit 131 ends the process A1. This means that it has been determined that the two persons are not the same person because the distance between the two persons is far. When the distance X is less than or equal to the threshold (YES), the object state managing unit 131 proceeds to step S22-4.

In step S22-4, the object state managing unit 131 adds the three-dimensional position and the image acquisition time of the n-th detected object to the attribute information of the m-th registered object. This means that, because the distance between these objects is close, these objects are the same person and the position of the n-th detected object is determined to be the position of the m-th registered object at image acquisition time T.

As long as the registered object is detected from the image, the attribute information of the registered object list will increase each time the object state updating process is executed. Conversely, the attribute information of the registered object list represents the time series of the position where the registered object is detected in the management target space. Therefore, the movement of the registered object can be tracked by the attribute information of the registered object list.

In step S22-5, the object state managing unit 131 sets the existence confirmation flag of the m-th registered object. That is, 1 is set in the existence confirmation flag of the m-th registered object. This means that, because an object matching the registered object has been detected in step S22-3, it has been determined that the registered object exists in the management target space R1 also at the image acquisition time T.

FIG. 14 is a flowchart illustrating an example of process A4 of the registered object list updating process. Process A4 is a process to delete, from the registered object list, the registered object whose existence has not been confirmed in process A1.

In step S22-6, the object state managing unit 131 initializes the variable m to 1.

In step S22-7, the object state managing unit 131 determines whether the existence of the m-th registered object has been confirmed. Specifically, the object state managing unit 131 determines whether the existence confirmation flag is 1 or 0. When the existence confirmation flag is 1 (YES), the object state managing unit 131 proceeds to step S22-9. When the existence confirmation flag is 0 (NO), the object state managing unit 131 proceeds to step S22-8.

In step S22-8, the object state managing unit 131 deletes the m-th registered object from the registered object list.

In step S22-9, the object state managing unit 131 determines whether the variable m is equal to the number of pieces of data M. When the variable m is different from the number of pieces of data M (NO), the object state managing unit 131 proceeds to step S22-10. When the variable m is equal to the number of pieces of data M (YES), the object state managing unit 131 ends the process.

In step S22-10, the object state managing unit 131 increments the variable m. Then, the object state managing unit 131 returns the processing to step S22-7.

Referring back to FIG. 11, further explanations will be given. In step S23, the object state managing unit 131 executes the group ID applying process described later to apply a group ID to registered objects included in the registered object list.

The group ID applying process is executed in the framework of the second basic flowchart (see FIG. 9). Specifically, process B1 (FIG. 15 or 16) is executed for all combinations of two registered objects, with the registered object list as list A. There is no process corresponding to processes B2 to B5.

There are various methods for determining whether a certain object and another object belong to the same group. In the present embodiment, group determination according to position proximity and group determination according to group action are explained. However, the method of group determination is not limited to these, and any technique can be used as long as the method enables group determination of objects from images.

Figure 15:
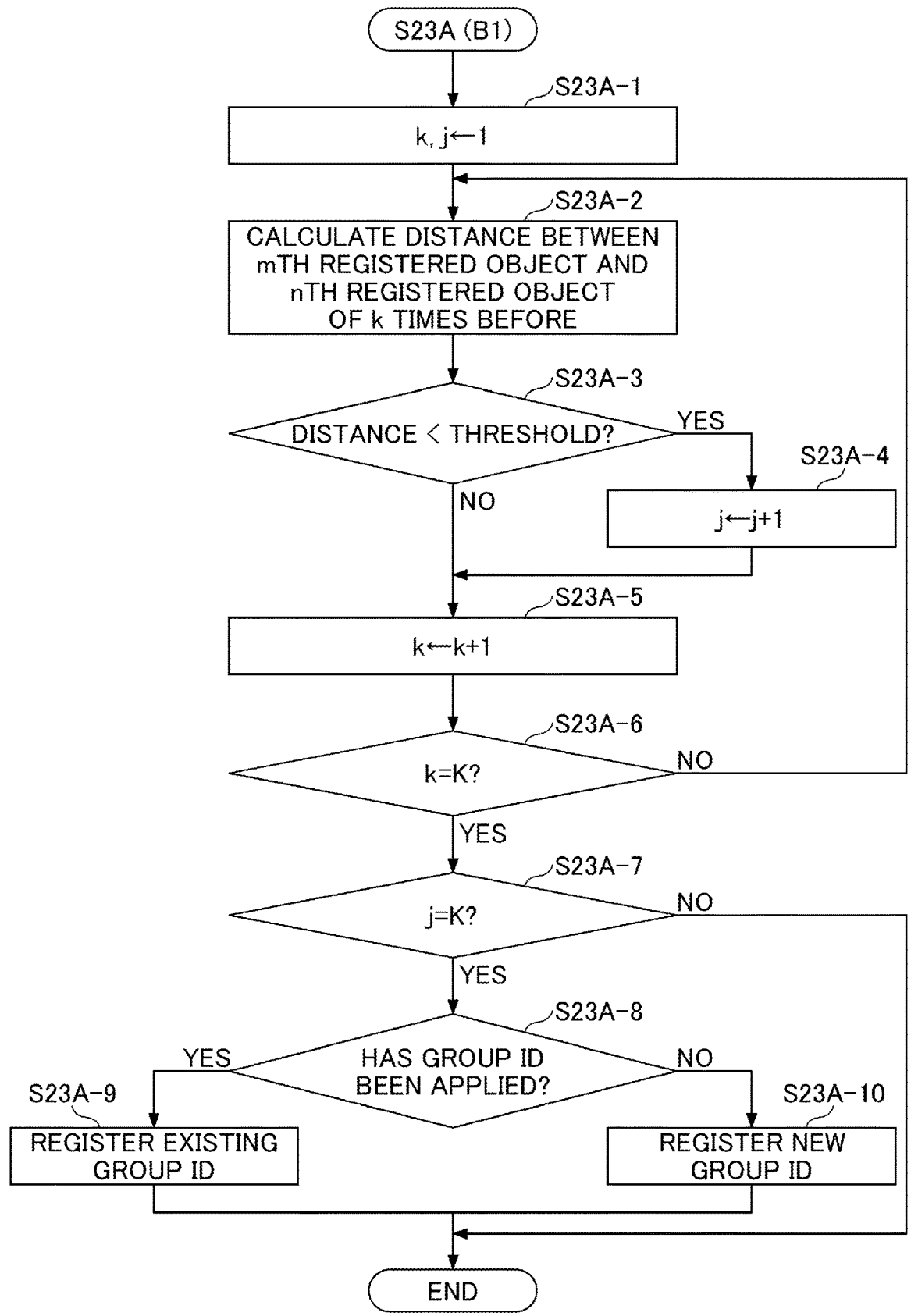
FIG. 15 illustrates a first example of a group ID applying process in one embodiment of the present invention.

FIG. 15 is a flowchart illustrating a first example of a group ID applying process (step S23 in FIG. 11) executed by the object state managing unit 131 in the present embodiment. The first example of the group ID applying process is group determination by position proximity.

Group determination by position proximity is a process in which two objects at positions close to each other detected consecutively for the most recent predetermined number of times, are registered as a group. The predetermined number of times is, for example, five times. When the time interval for executing the device management method is three seconds, two objects detected at positions in close proximity consecutively for 15 seconds would be determined as belonging to the same group.

Here, the process is executed on a combination of the m-th registered object and the n-th registered object in the registered object list.

In step S23A-1, the object state managing unit 131 initializes the variable k and the variable j to 1. The variable k is a counter representing the number of times it has been determined whether two objects are close together. The variable j is a counter representing the number of times that it has been determined that two objects are close together.

In step S23A-2, the object state managing unit 131 calculates the distance X between the three-dimensional coordinates before k times of the m-th registered object and the three-dimensional coordinates before k times of the n-th registered object.

In step S23A-3, the object state managing unit 131 determines whether the distance X is less than a predetermined threshold (for example, one meter). When the distance X is less than the threshold (YES), the object state managing unit 131 proceeds to step S23A-4. When the distance X is greater than or equal to the threshold (NO), the object state managing unit 131 proceeds to step S23A-5.

In step S23A-4, the object state managing unit 131 increments the variable j.

In step S23A-5, the object state managing unit 131 increments the variable k.

In step S23A-6, the object state managing unit 131 determines whether the variable k is equal to a predetermined number of times K. When the variable k is different from the predetermined number of times K (NO), the object state managing unit 131 returns step S23A-2. When the variable k is equal to the predetermined number of times K (YES), the object state managing unit 131 proceeds to step S23A-7.

In step S23A-7, the object state managing unit 131 determines whether the variable j is equal to the predetermined number of times K. When the variable j is different from the predetermined number of times K (NO), the object state managing unit 131 ends the process. When the variable j is equal to the predetermined number of times K (YES), the object state managing unit 131 proceeds to step S23A-8.

In step S23A-8, the object state managing unit 131 determines whether a group ID is applied to either the m-th registered object or the n-th registered object. When a group ID is applied (YES), the object state managing unit 131 proceeds to step S23A-9. When no group ID is applied (NO), the object state managing unit 131 proceeds to step S23A-10.

In step S23A-9, the object state managing unit 131 determines either the group ID applied to the m-th registered object or the group ID applied to the n-th registered object, as the group ID to be applied. Next, in the registered object list, the object state managing unit 131 sets the determined group ID to the group ID of the m-th registered object and the n-th registered object.

The object state managing unit 131 determines the group ID to be applied as follows. When a group ID is applied to only one registered object, this group ID is determined to be the group ID to be applied. That is, the registered object without a group ID is added to the members of an existing group.

When a group ID is applied to both registered objects, first, the registered objects corresponding to the m+1-th registered object and onwards are sorted by group IDs, to identify the registered objects with the same group ID as the m-th registered object. Next, the group IDs of the m-th registered object and all of the identified registered objects are updated to be the group ID of the n-th registered object. Accordingly, all members of the group to which the m-th registered object belongs, will belong to the same group as the n-th registered object. Thus, the group to which three or more registered objects belong can be identified.

In step S23A-10, the object state managing unit 131 issues a new group ID that does not overlap with any other group ID. Next, in the registered object list, the object state managing unit 131 sets the issued new group ID to the group ID of the m-th registered object and the n-th registered object.

Figure 16:
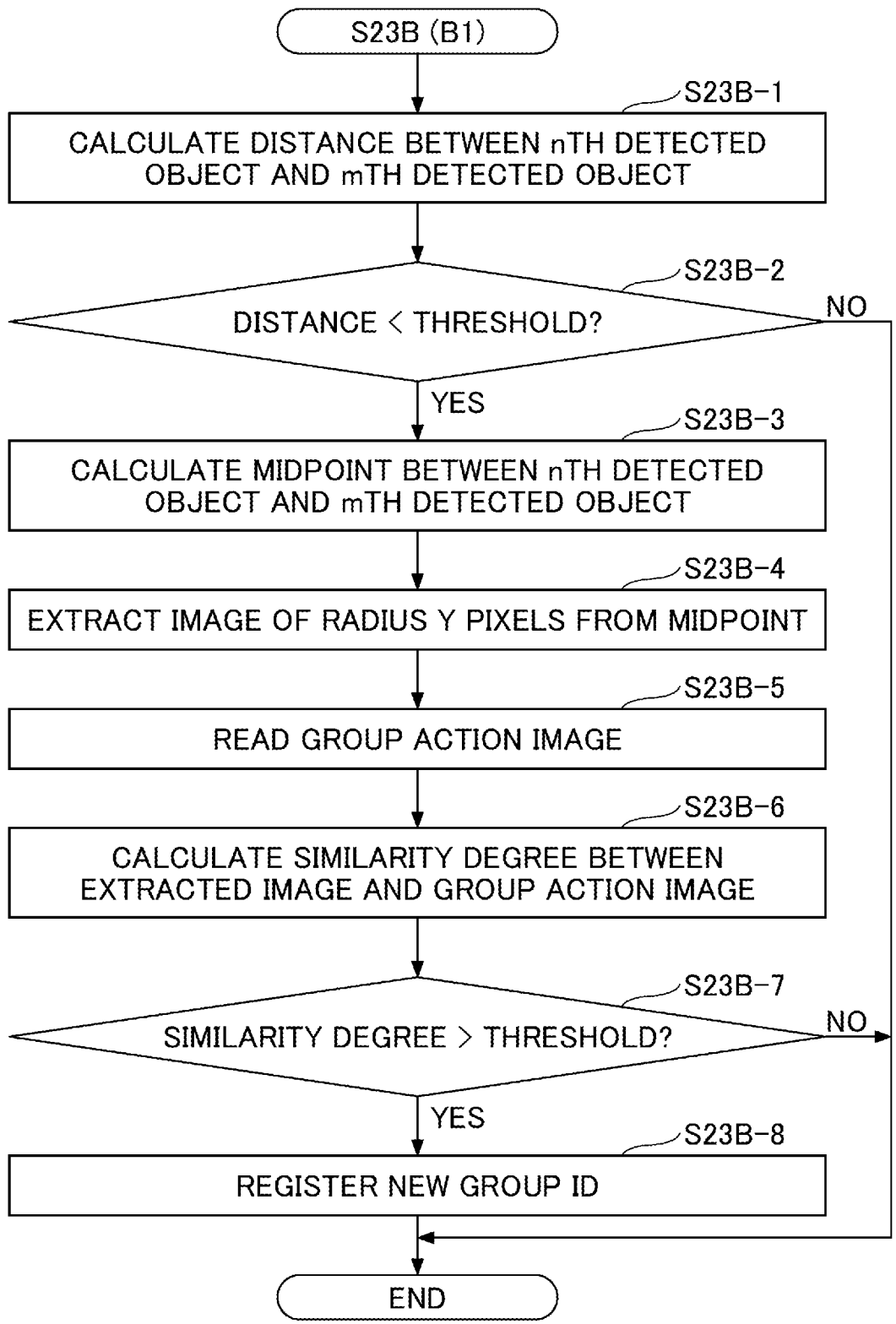
FIG. 16 illustrates a second example of a group ID applying process in one embodiment of the present invention.

FIG. 16 is a flowchart illustrating a second example of a group ID applying process (step S23 in FIG. 11) executed by the object state managing unit 131 in the present embodiment. The second example of group ID applying process is group determination according to group action.

Group determination according to group action is processing in which group determination is done by image analysis after a detected object list is created. Therefore, when group determination is done according to group action, step S23 is executed between step S21 and step S22.

Here, processing is executed on a combination of the m-th detected object and the n-th detected object in the detected object list.

In step S23B-1, the object state managing unit 131 calculates the distance X between the three-dimensional coordinates of the n-th detected object and the three-dimensional coordinates of the m-th detected object.

In step S23B-2, the object state managing unit 131 determines whether the distance X is less than a predetermined threshold (for example, one meter). When the distance X is greater than or equal to the threshold (NO), the object state managing unit 131 ends the process. When the distance X is less than the threshold (YES), the object state managing unit 131 proceeds to step S23B-3.

In step S23B-3, the object state managing unit 131 calculates the midpoint between the three-dimensional coordinates of the n-th detected object and the three-dimensional coordinates of the m-th detected object. Specifically, the object state managing unit 131 divides the sum each of the X coordinates, the Y coordinates, and the Z coordinates of the two detected objects, by two.

In step S23B-4, the object state managing unit 131 extracts an image P having a radius Y of Y pixels centered on the midpoint. The radius Y is set such that the range included in the image P becomes approximately one meter in distance in a real space, according to the resolution of the image.

In step S23B-5, the object state managing unit 131 reads a group action image stored in advance. The group action image is a set of images representing actions determined to belong to the same group. An example is an image of two people greeting each other or shaking hands, etc.

In step S23B-6, the object state managing unit 131 calculates the similarity degree between the image P and each group action image by pattern matching or the like.

In step S23B-7, the object state managing unit 131 determines whether any of the calculated similarity degrees exceeds a predetermined threshold. When there is a similarity degree exceeding the threshold (YES), the object state managing unit 131 proceeds to step S23B-8. When there is no similarity degree exceeding the threshold (NO), the object state managing unit 131 ends the process.

In step S23B-8, the object state managing unit 131 issues a new group ID that does not overlap with any other group ID. Next, in the detected object list, the object state managing unit 131 sets the issued new group ID to the group ID of the m-th detected object and the n-th detected object.

In step S22-4 (see FIG. 13) of the registered object list updating process executed thereafter, the object state managing unit 131 sets the group ID of the detected object determined to be the same object, to the group ID of the registered object. When an existing group ID is applied to the registered object, steps S23A-8 through S23A-10 (see FIG. 15) of the first example of the group ID applying process are executed.

Referring back to FIG. 10, further explanations will be given. In step S3, the operation information transmitting unit 31 provided in the electronic device 30-1 determines whether the operation content is information to be reported to the management apparatus 10 according to the operation performed by the user at the electronic device 30-1. This determination is made according to whether the operation content matches any predetermined operation content.

When the operation information transmitting unit 31 determines that the operation content is to be reported, the operation information transmitting unit 31 transmits device operation information relating to the device operation to the management apparatus 10. In the management apparatus 10, the operation information receiving unit 12 receives the device operation information from the electronic device 30-1.

The operation contents and operation information in the present embodiment are exemplified below.

Example 1

Operation content: Device login
Operation information: Registered device ID, device authentication ID (if authentication is required), login time Example 2

Operation content: Process for which a fee is incurred (copy output, use of volume-based charging type software, etc.)
Operation information: Registered device ID, device authentication ID (if authentication is required), fee, input data, usage language Example 3

Operation content: None
Operation information: State information such as maintenance and energy saving mode The registered device ID is identification information included in the registered device list stored in the state storage unit 100 of the management apparatus 10. The registered device ID is allocated to each of the electronic devices 30 installed in the management target space R1. The device authentication ID is authentication information used by the user of the electronic device 30 for using the electronic device 30.

In step S4, the state managing unit 13 provided in the management apparatus 10 requests operation information from the operation information receiving unit 12. Next, the state managing unit 13 inputs the operation information received from the operation information receiving unit 12 to the device state managing unit 132.

Subsequently, the device state managing unit 132 executes the device state updating process described later to update the registered device list of the state management information stored in the state storage unit 100.

<<Device State Updating Process>>

Figure 17:
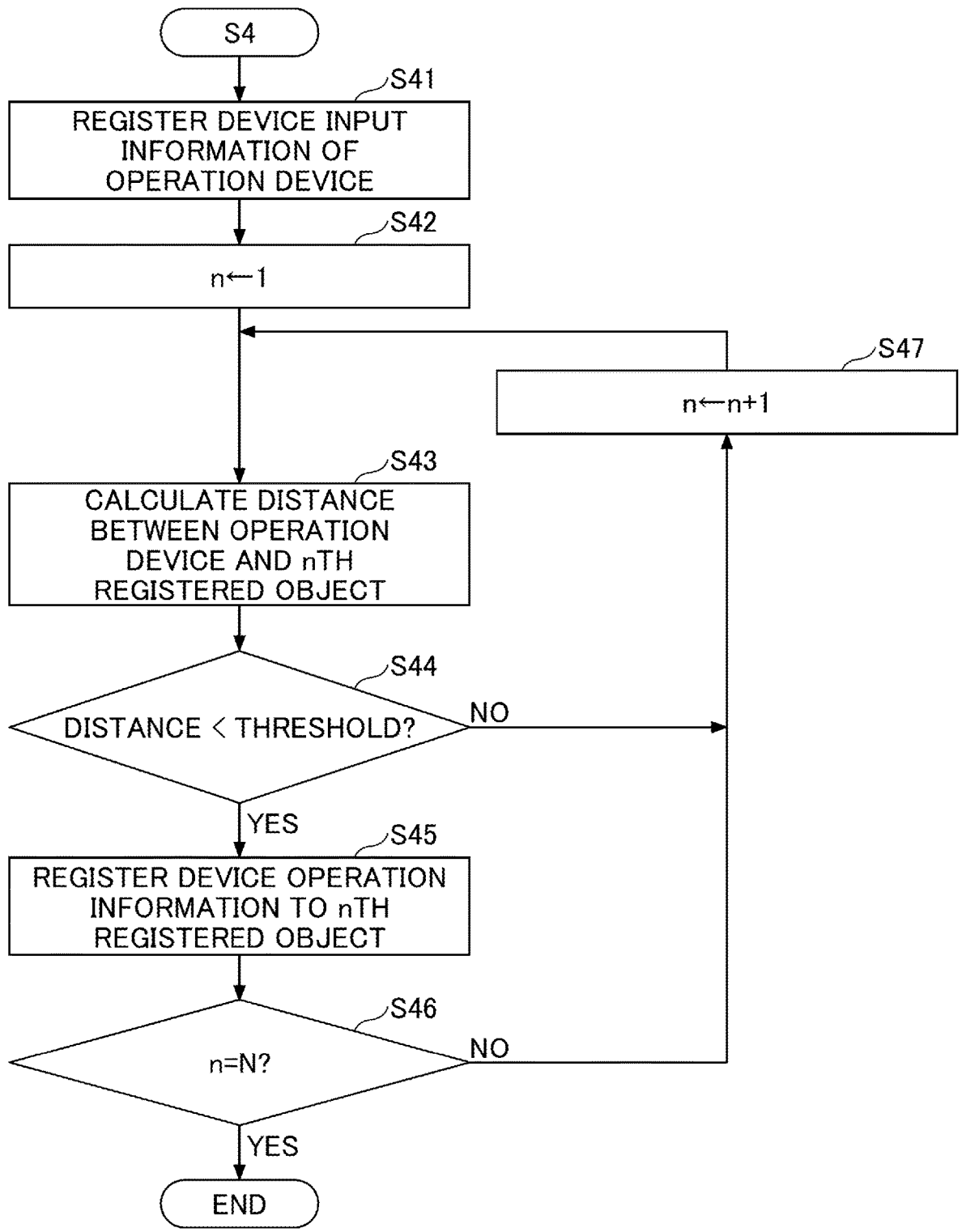
FIG. 17 illustrates an example of a device state updating process in one embodiment of the present invention.

The device state updating process in the present embodiment will be described with reference to FIG. 17. FIG. 17 is a flowchart illustrating an example of the device state updating process (step S4 in FIG. 10) executed by the device state managing unit 132 in the present embodiment.

In step S41, the device state managing unit 132 identifies the registered device included in the registered device list by the registered device ID included in the device operation information. Next, the device state managing unit 132 sets the received device operation information in the device input information of the identified registered device.

In step S42, the device state managing unit 132 initializes the variable n to 1.

In step S43, the device state managing unit 132 calculates the distance X between the three-dimensional coordinates of the identified registered device and the latest three-dimensional coordinates of the n-th registered object. The three-dimensional coordinates of the registered device are set in advance by the same method as that of the three-dimensional coordinates of the registered object. The installation position of the registered device may be moved, and, therefore, it is necessary to update the three-dimensional coordinates of the registered device periodically, but the update frequency can be low.

In step S44, the device state managing unit 132 determines whether the distance X is less than a predetermined threshold (for example, one meter). When the distance X is greater than or equal to the threshold (NO), the device state managing unit 132 proceeds to step S48. When the distance X is less than the threshold (YES), the device state managing unit 132 proceeds to step S45.

In step S45, the device state managing unit 132 adds the device input information of the identified registered device to the device operation information of the n-th registered object. The device operation information of the registered object list is configured such that a predetermined number of pieces of device input information can be stored.

In step S46, the device state managing unit 132 determines whether the variable n is equal to the number of pieces of data N. When the variable n is different from the number of pieces of data N (NO), the device state managing unit 132 proceeds to step S47. When the variable n is equal to the number of pieces of data N (YES), the device state managing unit 132 ends the process.

In step S47, the device state managing unit 132 increments the variable n. Then, the device state managing unit 132 returns the processing to step S43.

The following is explained with reference to FIG. 10. In step S5, the output information determining unit 133 provided in the management apparatus 10 executes an output information determining process described later and determines an operation instruction to be transmitted to the electronic device 30 based on the state management information stored in the state storage unit 100.

<<Output Information Determining Process>>

Figure 18:
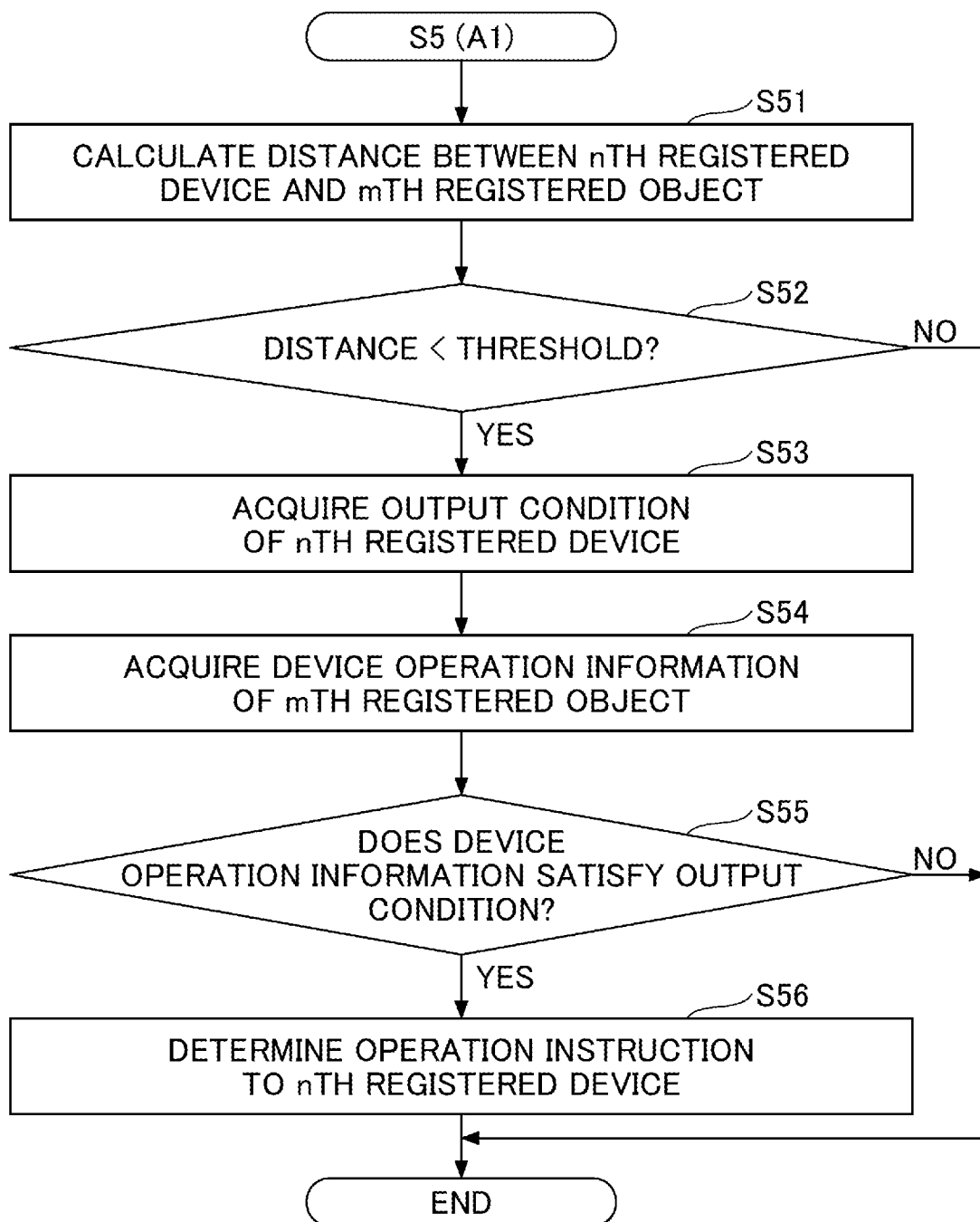
FIG. 18 illustrates an example of an output information determining process in one embodiment of the present invention.

Here, an output information determining process in the present embodiment will be described with reference to FIGS. 18 and 19. FIG. 18 is a flowchart illustrating an example of an output information determining process (step S5 in FIG. 10) executed by the output information determining unit 133 in the present embodiment.

The output information determining process is executed in the framework of the first basic flowchart (see FIG. 8). Specifically, process A1 (see FIG. 18) is executed for all combinations of registered devices and registered objects, with the registered device list as list A, and the registered object list as list B. There is no process corresponding to processes A2 to A5.

Here, processing is executed on the combination of the n-th registered device in the registered device list and the m-th registered object in the registered object list.

In step S51, the output information determining unit 133 calculates the distance X between the latest three-dimensional coordinates of the n-th registered device and the latest three-dimensional coordinates of the m-th registered object.

In step S52, the output information determining unit 133 determines whether the distance X is less than a predetermined threshold (for example, one meter). When the distance X is greater than or equal to the threshold (NO), the device state managing unit 132 ends the process. When the distance X is less than the threshold (YES), the device state managing unit 132 proceeds to step S53.

In step S53, the output information determining unit 133 acquires the output condition included in the device output information of the n-th registered device from the registered device list stored in the state storage unit 100.

In step S54, the output information determining unit 133 acquires the device operation information of the m-th registered object from the registered object list stored in the state storage unit 100.

In step S55, the output information determining unit 133 determines whether any of the pieces of device operation information acquired in step S54 satisfies the output condition acquired in step S53. When all of the pieces of device operation information do not satisfy the output condition (NO), the device state managing unit 132 ends the process. If any of the pieces of device operation information satisfies the output condition (YES), the device state managing unit 132 proceeds to step S56.

In step S56, the output information determining unit 133 acquires an operation instruction corresponding to the output condition acquired in step S53 from the device output information of the n-th registered device. The operation instruction of the registered device may include one that adaptively performs processing according to the attribute information of the registered device. For example, a condition such as not transmitting an operation instruction when the registered device is in an inoperable state may be included. An inoperable state is, for example, a power-off state or a paused state.

Figure 19:
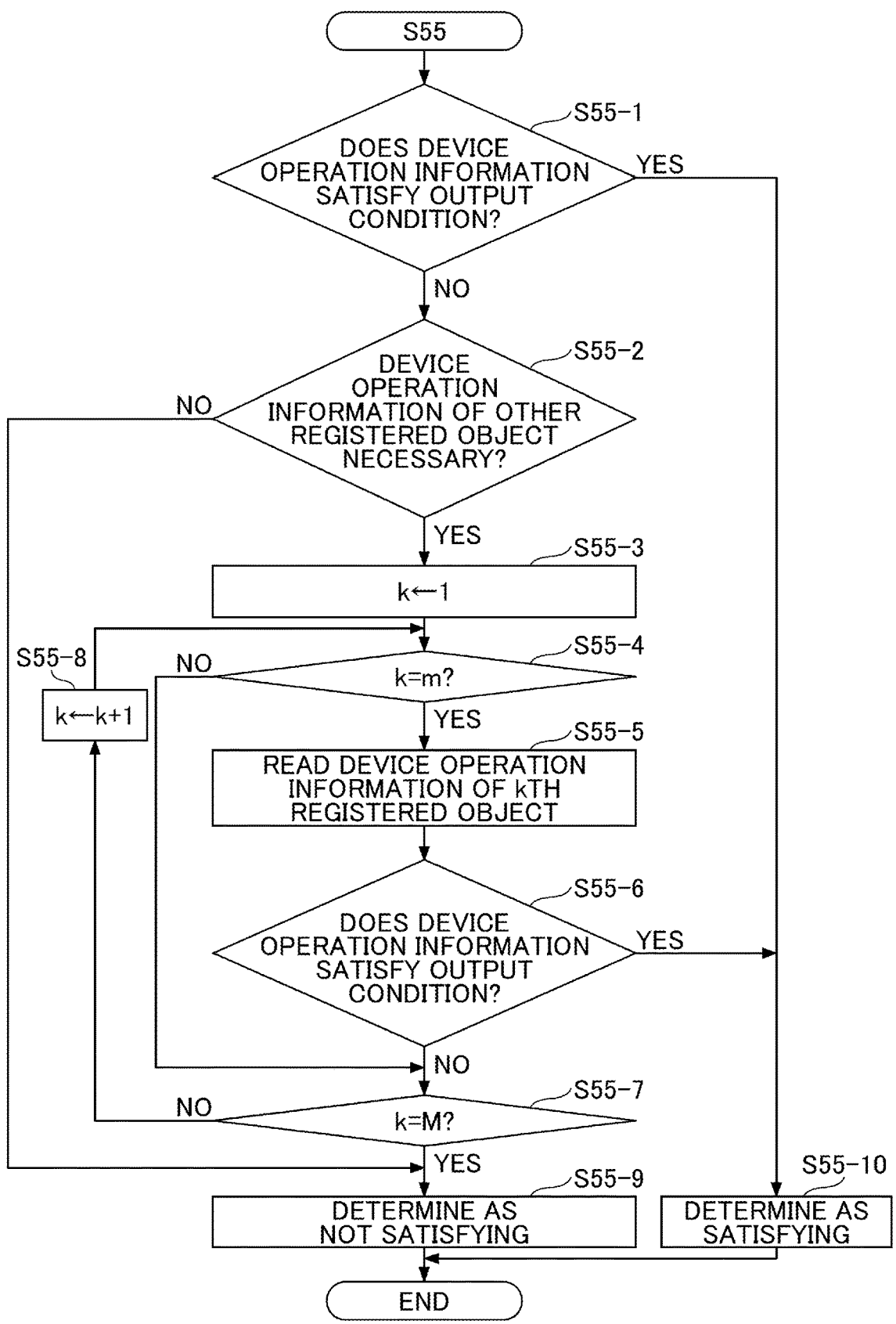
FIG. 19 illustrates an example of an output condition determining process in one embodiment of the present invention.

FIG. 19 is a flowchart illustrating a modified example of an output condition determining process (step S55 in FIG. 18) executed by the output information determining unit 133 in the present embodiment.

In the output information determining process illustrated in FIG. 18, it is determined whether the output condition is satisfied or not based only on the device operation information of the m-th registered object in step S55. In the output information determining process illustrated in FIG. 19, it is determined whether the output condition is satisfied or not by referring to device operation information other than that of the m-th registered device.

In step S55-1, the output information determining unit 133 determines whether any of the pieces of device operation information of the m-th registered object satisfies the output condition of the n-th registered device. When any of the pieces of device operation information satisfies the output condition (YES), the output information determining unit 133 proceeds to step S55-10. When all of the pieces of device operation information do not satisfy the output condition (NO), the output information determining unit 133 proceeds to step S55-2.

In step S55-2, the output information determining unit 133 determines whether the device operation information of another registered object is necessary based on the output condition of the n-th registered device. When the device operation information of another registered object is necessary (YES), the output information determining unit 133 proceeds to step S55-3. When the device operation information of another registered object is not necessary (NO), the output information determining unit 133 proceeds to step S55-9.

In step S55-3, the output information determining unit 133 initializes the variable k to 1.

In step S55-4, the output information determining unit 133 determines whether the variable k is equal to the variable m. When the variable k is equal to the variable m (YES), the output information determining unit 133 proceeds to step S55-5. When the variable k is not equal to the variable m (NO), the output information determining unit 133 proceeds to step S55-7.

In step S55-5, the output information determining unit 133 acquires the device operation information of the k-th registered object from the registered object list stored in the state storage unit 100.

In step S55-6, the output information determining unit 133 determines whether any of the pieces of device operation information of the k-th registered object satisfies the output condition of the n-th registered device. When any of the pieces of device operation information satisfies the output condition (YES), the output information determining unit 133 proceeds to step S55-10. When all of the pieces of device operation information do not satisfy the output condition (NO), the output information determining unit 133 proceeds to step S55-7.

In step S55-7, the output information determining unit 133 determines whether the variable k is equal to the number of pieces of data M. When the variable k is different from the number of pieces of data M (NO), the output information determining unit 133 proceeds to step 55-8. When the variable m is equal to the number of pieces of data M (YES), the output information determining unit 133 proceeds to step S55-9.

In step S55-8, the output information determining unit 133 increments the variable k. Then, the output information determining unit 133 returns to step S55-4.

In step S55-9, the output information determining unit 133 determines that the device operation information acquired in step S54 does not satisfy the output condition acquired in step S53, and ends the process.

In step S55-10, the output information determining unit 133 determines that the device operation information acquired in step S54 satisfies the output condition acquired in step S53, and ends the process.

FIG. 20 illustrates an example of the device output information in the present embodiment. The first example of the output condition of the device output information in the present embodiment is the output condition that does not require the device operation information of other registered objects. The second example of the output condition of the device output information in the present embodiment are the output conditions that require the device operation information of other registered objects.

As illustrated in FIG. 20, the first example of the output condition in the present embodiment is that the authentication information input by the m-th registered object (hereafter also referred to as "person α") in another electronic device (assumed to be an MFP here) is authentication information that can be authenticated in the n-th electronic device (assumed to be an electronic blackboard here).

As illustrated in FIG. 20, when it is determined that the first example of the output condition is satisfied, one or more of the following operation instructions is determined as the operation instruction to be transmitted to the registered device. The first operation instruction is to automatically authenticate person α at the electronic blackboard. In this case, the operation instruction to be transmitted includes the authentication information input by person α in the MFP. The second operation instruction is to display "Mr. α, automatic authentication has been performed." on the electronic blackboard for several seconds.

The third operation instruction is to display the message of "display information that you input at device OO (name of MFP) just then?" and a "yes" or "no" selection button, when person α has been inputting information at the MFP (for example, a scanning operation). In this case, if "yes" is selected, the information input by the scanner is displayed on the electronic blackboard.

The fourth operation instruction is to identify the usage language set in the MFP from the device operation information of person α and apply this on the display of the electronic blackboard. The fifth operation instruction is not to transmit an operation instruction if the attribute information of the electronic blackboard is a paused state such as "during energy saving mode".

As illustrated in FIG. 20, the second example of the output condition in the present embodiment is that the authentication information input by the k-th registered object (hereinafter, also referred to as "person β") in another electronic device (assumed to be an MFP here) is authentication information that can be authenticated in the n-th electronic device (assumed to be an electronic blackboard here). Note that person β has the same group ID as person α.

As illustrated in FIG. 20, when it is determined that the second example of the output condition is satisfied, one or more of the following operation instructions is determined as the operation instruction to be transmitted to the registered device. The first operation instruction is to automatically authenticate person α at the electronic blackboard. In this case, the operation instruction to be transmitted includes the authentication information input by person β in the MFP. The second operation instruction is to display on the electronic blackboard, for several seconds, "automatic authentication has been performed by the authentication information of Mr. β".

The third operation instruction is to display the message of "display information that Mr. β input at device OO (name of MFP) just then?" and a "yes" or "no" selection button, when person β has been inputting information at the MFP (for example, a scanning operation). In this case, if "yes" is selected, the information input by the scanner is displayed on the electronic blackboard.

Referring back to FIG. 10, further explanations will be given. In step S6, the output information determining unit 133 provided in the management apparatus 10 sends the operation instruction information representing the operation instruction to the operation instructing unit 14. The operation instruction information includes the determined operation instruction and information indicating the electronic device 30-2 that is the transmission destination.

The operation instructing unit 14 receives operation instruction information from the output information determining unit 133. Next, the operation instructing unit 14 transmits the operation instruction included in the operation instruction information to the electronic device 30-2 that is the transmission destination included in the operation instruction information.

In the electronic device 30-2, the device control unit 32 receives the operation instruction from the management apparatus 10. Next, the device control unit 32 executes the operation using the input information included in the operation instruction according to the received operation instruction. For example, the device control unit 32 uses the authentication information included in the operation instruction to authenticate the user. For example, the device control unit 32 uses the setting information included in the operation instruction to change the setting of the electronic device 30-2.

The following is another example relevant to step S5 of FIG. 10.

FIG. 21 is a diagram illustrating an example of the device output information in the present embodiment. This example of the device output information in the present embodiment includes the output condition relating to the payment in an unmanned store. This example of the device output information includes both the output condition for which the device operation information of another registered object is not required and the output condition for which the device operation information of another registered object is required (group ID utilization).

This example of device output information is an application example of applying to a usage scene in which the electronic device 30-1 is an MFP and the electronic device 30-2 is a settlement apparatus (self-service terminal), and the MFP usage fee is paid at the settlement apparatus.

As illustrated in FIG. 21, the output condition 1-1 in the present embodiment is that device operation information exists, in which the m-th registered object (hereafter, also referred to as "person α") has performed an operation that incurs a fee at the electronic device 30-1 (assumed to be an MFP here), and the payment completed flag is 0 (=false), which indicates payment not completed.

As illustrated in FIG. 21, when it is determined that the output condition 1-1 is satisfied, one or more of the following operation instructions is determined as the operation instruction to be transmitted to the registered device (the electronic device 30-2) or the management apparatus 10. The first operation instruction is to display the MFP usage fee as the billing amount to be presented to person α, or to add the MFP usage fee to the fee for purchasing other articles, etc., and displaying the amount after the addition. The second operation instruction is to instruct the management apparatus to update the payment completed flag in the device operation information of person α to 1 (=true), which indicates payment completed.

The output condition 1-2 in the present embodiment is that device operation information exists, in which the k-th registered object (hereafter, also referred to as "person β") has performed an operation that incurs a fee at the electronic device 30-1 (assumed to be an MFP here), and the payment completed flag is 0 (=false), which indicates payment not completed. Note that person β is assumed to have the same group ID as person α.

When it is determined that the output condition 1-2 is satisfied, one or more of the following operation instructions is determined as the operation instruction to be transmitted to the registered device (the electronic device 30-2) or the management apparatus 10. The first operation instruction is to add the MFP usage fee relating to person β to the billing amount to be presented to person α. The second operation instruction is to display an option indicating that "person β will pay, not person α" and a "yes" or "no" selection button, with respect to the MFP usage fee relating to person β. When "yes" is selected, the billing amount to be presented to person α will be the amount to be billed plus the MFP usage fee relating to person β. When "no" is selected, the billing amount to be presented to person α will be the amount not including the MFP usage fee relating to person β. The third operation instruction is to instruct the management apparatus 10 to update the payment completed flag in the device operation information of person β to 1 (=true), which indicates payment completed, when person α has paid the billing amount to which the MFP usage fee relating to person β has been added.

The output condition 1-3 in the present embodiment is that device operation information exists, in which the m-th registered object (hereafter, also referred to as "person α") has performed an operation that incurs a fee at the electronic device 30-1 (assumed to be an MFP here), and but the payment completed flag is 1 (=true), which indicates payment completed. For example, this situation occurs when the k-th registered object (person V belonging to the same group has already paid the MFP usage fee of the m-th registered object (person α) (payment completed flag=1).

When it is determined that the output condition 1-3 is satisfied, the billing amount for person α is calculated without including the fee whose payment completed flag is 1. This processing can be easily executed with the well-known "if operation" of adding only the fee whose payment completed flag is not 1. If the only usage by person α in the store is the MFP usage fee, a message of "all fees have already been paid" is displayed. As in output condition 1-3, by giving an operation instruction only when a predetermined condition is satisfied, the convenience of the customer can be improved.

Referring back to FIG. 10, further explanations will be given relevant to the above example. In step S6, the output information determining unit 133 provided in the management apparatus 10 transmits the operation instruction information representing the operation instruction to the operation instructing unit 14. The operation instruction information includes information indicating the determined operation instruction.

The operation instructing unit 14 receives operation instruction information from the output information determining unit 133. Next, the operation instructing unit 14 transmits the operation instruction included in the operation instruction information to the electronic device 30-2, which is a settlement apparatus (self-service terminal).

In the electronic device 30-2 (settlement apparatus), the device control unit 32 receives the operation instruction from the management apparatus 10. Next, the device control unit 32 executes the operation using the fee information included in the operation instruction according to the received operation instruction. For example, the device control unit 32 displays the fee information included in the operation instruction on the display 506 in addition to the price of the articles purchased by the user.

Further, for example, when the device control unit 32 receives the fee information related to all members of the group to which the user belongs, the device control unit 32 displays the fee to be settled by the user on the display 506 in a selectable format. When the user desires individual settlement, the user can make the settlement by excluding the fee based on the operation of the electronic device by another user.

Furthermore, the device control unit 32 determines whether a group member of the group to which the user belongs has already paid the fee based on the payment completed flag, and removes the fee whose payment completed flag is 1 in advance so that this is not displayed on the display 506.

FIG. 22 is a diagram illustrating an example of device output information in the present embodiment. This example of device output information in the present embodiment includes output conditions relating to information linkage between electronic devices in an office. As in the above example, this example of device output information includes both output conditions that do not require device operation information relating to other registered objects and output conditions that require device operation information relating to other registered objects (group ID utilization).

This example of device output information is an application example applied to a usage scene in which the electronic device 30-1 is an MFP and the electronic device 30-2 is an electronic blackboard, and the authentication information input to the MFP is used to log in to the electronic blackboard.

As illustrated in FIG. 22, the output condition 2-1 in the present embodiment is that the authentication information input by the m-th registered object (hereafter also referred to as "person α") in another electronic device (assumed to be an MFP here) is authentication information that can be authenticated in the n-th electronic device (assumed to be an electronic blackboard here), and that the n-th electronic device is not already being used by another person.

By confirming that the n-th electronic device is not being used by another person, it is possible to prevent the display of the electronic blackboard being used by another person from being switched inadvertently by the approach of person α. Confirmation that the n-th electronic device is not being used by another person can be appropriately done by a well-known programming technique by the CPU of the electronic blackboard based on conditions such as that the electronic blackboard is being used by authentication or that writing has been performed on the electronic blackboard within the last minute.

Convenience of the customer can be improved by giving an operation instruction only when a predetermined condition is satisfied, as in output condition 2-1.

As illustrated in FIG. 22, when it is determined that the output condition 2-1 is satisfied, one or more of the following operation instructions is determined as the operation instruction to be transmitted to the registered device (the electronic device 30-2). The first operation instruction is to automatically authenticate person α at the electronic blackboard. In this case, the operation instruction to be transmitted includes the authentication information input by person α in the MFP. The second operation instruction is to display "Mr. α, automatic authentication has been performed." on the electronic blackboard for several seconds.

The third operation instruction is to display the message of "display information that you input at device OO (name of MFP) just then?" and a "yes" or "no" selection button, when person α has been inputting information at the MFP (for example, a scanning operation). In this case, if "yes" is selected, the information input by the scanner is displayed on the electronic blackboard.

The fourth operation instruction is to identify the usage language set in the MFP from the device operation information of person α and apply this on the display of the electronic blackboard.

As a modified example of the output condition 2-1, an output condition may be used in which the attribute information of the electronic blackboard is not in a paused state such as "during energy saving mode". In this way, the power of the electronic blackboard in a paused state is not turned on by the approach of person α, and energy use efficiency is high.

As illustrated in FIG. 22, the output condition 2-2 in the present embodiment is that the authentication information input by the k-th registered object (hereinafter, also referred to as "person β") in another electronic device (assumed to be an MFP here) is authentication information that can be authenticated in the n-th electronic device (assumed to be an electronic blackboard here). Note that person β has the same group ID as person α.

As illustrated in FIG. 22, when it is determined that the output condition 2-2 is satisfied, one or more of the following operation instructions is determined as the operation instruction to be transmitted to the registered device (the electronic device 30-2). The first operation instruction is to automatically authenticate person α at the electronic blackboard. In this case, the operation instruction to be transmitted includes the authentication information input by person β in the MFP. The second operation instruction is to display on the electronic blackboard, for several seconds, "automatic authentication has been performed by the authentication information of Mr. β".

The third operation instruction is to display the message of "display information that Mr. β input at device OO (name of MFP) just then?" and a "yes" or "no" selection button, when person β has been inputting information at the MFP (for example, a scanning operation). In this case, if "yes" is selected, the information input by the scanner is displayed on the electronic blackboard.

Referring back to FIG. 10, further explanations will be given. In step S6, the output information determining unit 133 provided in the management apparatus 10 sends the operation instruction information representing the operation instruction to the operation instructing unit 14. The operation instruction information includes the determined operation instruction and information indicating the electronic device 30-2 that is the transmission destination.

The operation instructing unit 14 receives operation instruction information from the output information determining unit 133. Next, the operation instructing unit 14 transmits the operation instruction included in the operation instruction information to the electronic device 30-2 that is the transmission destination included in the operation instruction information.

In the electronic device 30-2, the device control unit 32 receives the operation instruction from the management apparatus 10. Next, the device control unit 32 executes the operation using the input information included in the operation instruction according to the received operation instruction. For example, the device control unit 32 uses the authentication information included in the operation instruction to authenticate the user. For example, the device control unit 32 uses the setting information included in the operation instruction to change the setting of the electronic device 30-2.

<Effect of the Embodiment>

The device management system 1 in the present embodiment tracks the movement of a person based on an image capturing the vicinity of an electronic device 30, and sends an operation instruction using information input by the user in the first electronic device 30-1, to the second electronic device 30-2 that has detected that the user is in the vicinity. Therefore, the device management system 1 in the present embodiment allows the second electronic device to execute an operation using information input in the first electronic device.

In particular, by transmitting an authentication instruction to perform authentication by using authentication information authenticated by the first electronic device 30-1 to the second electronic device 30-2, authentication can be automatically performed when a user authenticated by the first electronic device 30-1 moves to the vicinity of the second electronic device 30-2. That is, according to the device management system in the present embodiment, single sign-on by hardware linkage can be implemented.

Application Example

In the above example, the management target space is assumed to be a conference room or an office room in an office, and the example of managing the electronic device 30 as Office Automation (OA) equipment is mainly explained. However, the applicable usage scene of the device management system 1 is not limited thereto, and the device management system 1 can be applied to various usage scenes.

For example, the device management system 1 can be configured to manage an electronic device installed in a hotel. Various electronic devices are installed in a hotel. The lobby, for example, may have automatic check-in machines. Further, guest rooms may have set-top boxes that can play television broadcasts and on-demand videos. By managing these devices with the device management system 1, it becomes possible to automatically set a usage language set by hotel guests at the automatic check-in machine to the usage language used by the set-top box. For example, the automatic check-in machine is one example of the first electronic device, and the set-top box is one example of the second electronic device. The examples of the first electronic device and the second electronic device may be other devices or the contents of the first electronic device and the second electronic device may be interchanged.

Also, for example, the device management system 1 can be configured to manage an electronic device installed at the airport. At the airport, passengers are required to go through procedures such as ticketing, check-in, and baggage inspection before boarding an aircraft, and a boarding pass is processed by an exclusive-use electronic device at each procedure. By managing these devices with the device management system 1, it becomes possible to automatically set the usage language set at the electronic device that performs the previous procedure to the usage language used by the electronic device that performs the next procedure. For example, an automatic check-in machine for ticketing and check-in is one example of the first electronic device, and various service devices (devices used for shops, lounges, money exchange, and other procedures) used after ticketing and check-in are examples of the second electronic device. Note that the examples of the first electronic device and the second electronic device may be other devices or the contents of the first electronic device and the second electronic device may be interchanged.

For example, the device management system 1 can be configured to manage electronic devices such as search terminals installed in bookstores and libraries. The device management system 1 can be used to enhance marketing by linking the search performed by the customer on the search terminal with the information on the bookshelf to which the customer had moved thereafter. For example, a search terminal is an example of a first electronic device, and a settlement apparatus or lending machine (such as a terminal with a bar code reader) is an example of a second electronic device. Note that the examples of the first electronic device and the second electronic device may be other devices or the contents of the first electronic device and the second electronic device may be interchanged.

For example, the device management system 1 can be configured to manage electronic devices such as PCs installed in a factory. By verifying the actions of workers in association with the contents of device operations on devices installed in the work site, the work validity of workers can be monitored. For example, an information processing terminal (such as a PC installed at the location of a worker, etc.) is an example of a first electronic device, and a work device (manufacturing device of products, inspection device, printing device, etc.) is an example of a second electronic device. Note that the examples of the first electronic device and the second electronic device may be other devices or the contents of the first electronic device and the second electronic device may be interchanged.

Also, for example, the device management system 1 can be configured to manage electronic devices installed in an unmanned store such as a convenience store. Electronic devices such as MFPs and settlement apparatuses such as self-service terminals are installed in convenience stores. By managing these devices by the device management system 1, it becomes possible, for example, to set the usage language set by the customer at the MFP as the usage language at the settlement apparatus. For example, the MFP is one example of the first electronic device, and the settlement apparatus such as the self-service terminal is one example of the second electronic device. Examples of the first and second electronic devices may be other devices. Conversely, a settlement apparatus may be set as the first electronic device and an MFP as the second electronic device. In this case, the device management system 1 can track the movement of a customer who has paid the printing fee in advance with the settlement apparatus and allow the customer to use a printing function or a fax transmission function according to the fee at the timing when the customer approaches the MFP.

For example, the device management system 1 can be configured to manage a ticketing machine (self-service terminal which is an example of the first electronic device) and a settlement apparatus (an example of the second electronic device) installed in a convenience store which is an unmanned store. In this way, even if the ticketing machine and the settlement apparatus cannot directly link information with each other via the network, the device management system 1 can request the customer to make an appropriate settlement by acquiring the ticket purchase information input at the ticketing machine and also by tracking the customer's movement and displaying the fee at the timing when the customer approaches the settlement apparatus.

[Supplement]

In each of the above embodiments, the management apparatus 10 is an example of an information processing apparatus. The device management system 1 is an example of an information processing system. The monitoring device 20 is an example of an imaging apparatus. The electronic device 30 is an example of a first electronic device and a second electronic device. The image receiving unit 11 is an example of a first image receiving unit and a second receiving unit. The operation information receiving unit 12 is an example of an input information receiving unit. The state managing unit 13 is an example of a first user identifying unit and a second user identifying unit.

The functions of each of the embodiments described above may be implemented by one or more processing circuits. As used herein, a "processing circuit" includes a processor programmed to execute each function by software such as a processor implemented in an electronic circuit; or devices such as an Application Specific Integrated Circuit (ASIC), a digital signal processor (DSP), a field programmable gate array (FPGA), and a conventional circuit module, designed to execute each function as described above.

Also, the apparatus group described in the examples is merely indicative of one of a plurality of computing environments for carrying out the embodiments disclosed herein. In one embodiment, the management apparatus 10 includes multiple computing devices, such as a server cluster. The multiple computing devices are configured to communicate with each other over any type of communication link, including a network, shared memory, etc., and perform the processing disclosed herein.

According to one embodiment of the present invention, the information used in a first electronic device can be used to set or operate a second electronic device.

The information processing apparatus, the information processing system, the device management method, and the recording medium are not limited to the specific embodiments described in the detailed description, and variations and modifications may be made without departing from the spirit and scope of the present invention.

What is claimed is:

1. An information processing apparatus comprising circuitry configured to:
   receive a first image capturing a first user existing at an operable position where a first electronic device is operable, the first electronic device being communicable with the information processing apparatus via a network;
   identify the first user based on the first image;
   receive, from the first electronic device, input information input to the first electronic device by the first user;
   receive a second image capturing a second user existing at an operable position where a second electronic device is operable, the second electronic device being communicable with the information processing apparatus via the network;
   identify the second user based on the second image; and
   in a case in which the first user and the second user are determined to be a same person, transmit information to the second electronic device based on the input information input to the first electronic device.

2. The information processing apparatus according to claim 1, wherein
   the input information includes usage information of using the first electronic device by the first user, and
   the information transmitted to the second electronic device includes the usage information.

3. The information processing apparatus according to claim 1, wherein
   the circuitry is configured to record, in time series, position information of the first user and the second user by using the first image and the second image.

4. The information processing apparatus according to claim 3, wherein the circuitry is configured to identify the first user who has operated the first electronic device based on the position information in time series.

5. The information processing apparatus according to claim 4, wherein the circuitry is configured to record the position information by using a plurality of the first images and a plurality of the second images.

6. The information processing apparatus according to claim 1, wherein
   the circuitry is further configured to
   receive state information representing a state of the first electronic device and the second electronic device, and
   refrain from transmitting the information to the second electronic device for which the state information represents a paused state.

7. The information processing apparatus according to claim 1, wherein the circuitry is configured to instruct the second electronic device to perform an operation by using the information, in response to detecting that a predetermined condition is satisfied.

8. The information processing apparatus according to claim 2, wherein the circuitry is configured to instruct the second electronic device to perform an operation by using the usage information, in response to detecting that a predetermined condition is satisfied.

9. The information processing apparatus according to claim 8, wherein
   in response to detecting that the predetermined condition is that device operation information exists indicating that the first user has performed an operation that incurs a usage fee at the first electronic device and the usage fee is not paid,
   the circuitry is configured to instruct the second electronic device to perform the operation of displaying or adding the usage fee for using the first electronic device, with respect to a billing amount to be presented to the first user.

10. The information processing apparatus according to claim 8, wherein
    in response to detecting that the predetermined condition is that device operation information exists indicating that another user having a same group ID as the first user has performed an operation that incurs a usage fee at the first electronic device and the usage fee is not paid,
    the circuitry is configured to instruct the second electronic device to perform the operation of
       adding the usage fee for using the first electronic device relating to the another user, to a billing amount to be presented to the first user and displaying the billing amount after the addition, or
       displaying an option that not the first user but the another user will pay the usage fee for using the first electronic device relating to the another user.

11. The information processing apparatus according to claim 8, wherein
    in response to detecting that the predetermined condition is that device operation information exists indicating that the first user has performed an operation that incurs a usage fee at the first electronic device and the usage fee has been paid,
    the circuitry is configured to instruct the second electronic device to perform the operation of displaying a billing amount to be presented to the first user without including the paid usage fee.

12. The information processing apparatus according to claim 7, wherein
    in response to detecting that the predetermined condition is that device operation information exists indicating that the first user has performed an operation of logging in to the first electronic device, the input information input to the first electronic device by the first user can be authenticated at the second electronic device, and login has not been performed at the second electronic device,
    the circuitry is configured to instruct the second electronic device to perform the operation of performing login by using the input information input to the first electronic device by the first user.

13. The information processing apparatus according to claim 7, wherein
in response to detecting that the predetermined condition is that device operation information exists indicating that another user having a same group ID as the first user has performed an operation of logging in to the first electronic device, the input information input to the first electronic device by the another user can be authenticated at the second electronic device, and login has not been performed at the second electronic device,
the circuitry is configured to instruct the second electronic device to perform the operation of performing login by using the input authentication information input to the first electronic device by the another user.

14. The information processing apparatus according to claim 12, wherein
in response to detecting that the device operation information includes an operation of inputting information to the first electronic device,
the circuitry is configured to instruct the second electronic device to perform the operation of displaying an option indicating to display the information input to the first electronic device.

15. The information processing apparatus according to claim 1, wherein
the input information input to the first electronic device is authentication information.

16. The information processing apparatus according to claim 1, wherein
the information transmitted to the second electronic device includes the input information.

17. The information processing apparatus according to claim 1, wherein
the information transmitted to the second electronic device includes an instruction to perform an operation in the second electronic device.

18. An information processing system comprising:
a first electronic device;
a second electronic device;
an imaging apparatus; and
an information processing apparatus, wherein
the first electronic device, the second electronic device, the imaging apparatus, and the information processing apparatus are communicable with each other via a network, and
the information processing apparatus includes:
a first image receiver configured to receive, from the imaging apparatus, a first image capturing a first user existing at an operable position where the first electronic device is operable;
a first user identifier configured to identify the first user based on the first image;
an input information receiver configured to receive, from the first electronic device, input information input to the first electronic device by the first user;
a second image receiver configured to receive, from the imaging apparatus, a second image capturing a second user existing at an operable position where the second electronic device is operable;
a second user identifier configured to identify the second user based on the second image; and
an operation instructor configured to, in a case in which the first user and the second user are determined to be a same person, transmit information to the second electronic device based on the input information input to the first electronic device.

19. The information processing system according to claim 18, wherein the operation instructor instructs the second electronic device to perform an operation by using the information, in response to detecting that a predetermined condition is satisfied.

* * * * *